United States Patent [19]

Imamura et al.

[11] Patent Number: 5,605,981
[45] Date of Patent: Feb. 25, 1997

[54] PROCESS FOR THE PREPARATION OF HIGH MOLECULAR LACTIC COPOLYMER POLYESTER

[75] Inventors: Shoji Imamura; Hiroshi Ebato, both of Chiba, Japan

[73] Assignee: Dainippon Ink and Chemicals, Inc., Tokyo, Japan

[21] Appl. No.: 672,917

[22] Filed: Jun. 28, 1996

Related U.S. Application Data

[62] Division of Ser. No. 503,608, Jul. 18, 1995.

[30] Foreign Application Priority Data

Jul. 20, 1994 [JP] Japan .................................. 6-167960

[51] Int. Cl.$^6$ ........................................................ C08F 20/00
[52] U.S. Cl. ...................... 525/440; 525/437; 525/450; 524/779; 524/783; 524/784
[58] Field of Search ................................ 525/437, 440, 525/450; 524/779, 783, 784

[56] References Cited

U.S. PATENT DOCUMENTS

| | | |
|---|---|---|
| 5,310,872 | 5/1994 | Takahashi et al. . |
| 5,314,927 | 5/1994 | Kondo et al. . |
| 5,314,969 | 5/1994 | Imaizumi et al. . |
| 5,321,052 | 6/1994 | Taka et al. . |
| 5,324,556 | 6/1994 | Hino et al. . |
| 5,348,700 | 9/1994 | Nakamura et al. . |
| 5,349,028 | 9/1994 | Takahashi et al. . |
| 5,362,765 | 11/1994 | Taka et al. . |
| 5,387,665 | 2/1995 | Misawa et al. . |
| 5,391,644 | 2/1995 | Yasuda et al. . |

*Primary Examiner*—Samuel A. Acquah
*Attorney, Agent, or Firm*—Armstrong, Westerman, Hattori, McLeland, & Naughton

[57] ABSTRACT

The present invention provides a process for the preparation of a decomposable lactic copolymer polyester which exhibits a sufficiently high molecular weight, heat resistance and thermal stability and further exhibits a rigidity, flexibility and transparency depending on the purpose. The process for the preparation of a high molecular lactic copolymer polyester includes reacting a polyester terminated by hydroxyl group at both ends (B1) with a polyvalent isocyanate (E) having 2 or more functionalities to obtain a polyester (B4) having a weight-average molecular weight of from 10,000 to 300,000, and then allowing said polyester (B4) and lactide (A) to undergo ring opening copolymerization in the presence of a ring opening polymerization catalyst (D). A process is also provided which includes allowing a lactide (A) and a polyester terminated by hydroxyl group at both ends (B1) to undergo ring opening copolymerization in the presence of a ring opening polymerization catalyst (D) to prepare a polyester having a weight-average molecular weight of from 10,000 to 300,000, and then reacting said polyester with a polyvalent isocyanate having 3 or more functionalities.

7 Claims, No Drawings

PROCESS FOR THE PREPARATION OF HIGH MOLECULAR LACTIC COPOLYMER POLYESTER

This is a division of application Ser. No. 08/503,608 filed Jul. 18, 1995.

FIELD OF THE INVENTION

The present invention relates to a process for the preparation of a high molecular lactic copolymer polyester which comprises reacting a polyfunctional polyvalent carboxylic acid (or its acid anhydride) or polyfunctional polyvalent isocyanate in the preparation of a lactic copolymer to prepare a lactic copolymer having a higher molecular weight while arbitrarily varying the proportion and kind of the polyester to be incorporated as a starting material in the lactic copolymer to prepare high molecular lactic copolymer polyesters having different properties.

The lactic copolymer according to the present invention is biodegradable. The lactic copolymer according to the present invention can be subjected to various forming or molding processes such as extrusion molding, injection molding, blow molding and press molding. Thus, the lactic copolymer according to the present invention can be subjected to forming or molding by means of any existing apparatus for use with general-purpose resins. The lactic copolymer according to the present invention is useful as molding resin, coating resin, ink resin, adhesive resin, etc., particularly as molding resin for wrapping material.

Examples of the product worked from extruded sheet of the lactic copolymer of the present invention include tray, cup, cover, and blister. Examples of the product worked from the film of the lactic copolymer of the present invention include lap wrapping material, shrink wrapping material, stretch wrapping material, and bag such as trash bag, supermarket bag, standard bag and double bag. Examples of the extruded products which can be used as agricultural or fishing materials include agricultural multi-ply film, pesticide-releasing sheet, fowl net, curing net, sapling pot, fishing net, laver farming net, and fishing line. Examples of the extruded products which can be used as sanitary products include paper diaper, and sanitary napkin. Examples of the extruded products which can be used as medical products include artificial kidney, and stitching fiber. Examples of the blow-molded products to which the present invention can apply include shampoo bottle, cosmetics bottle, drink bottle, and oil vessel. Examples of the paper laminates to which the present invention can apply include tray, one-way vessel such as cup, and megaphone body.

Examples of the injection-molded products to which the present invention can apply include golf tee, applicator's core, candy's stick, brush, toothbrush, injector's cylinder, cover, dish, cup, comb, razor's haft, cassette of recording tape, disposable spoon and folk, and stationary such as ball point pen.

Other examples of the molded products to which the present invention can apply include binding tape, prepaid card, balloon, panty hose, hair cap, sponge, cellophane tape, umbrella, raincoat, plastic glove, rope, tube, foamed tray, foamed buffer, buffer, packing material, hot-melt adhesive, cigarette filter, and paint for ship bottom.

BACKGROUND OF THE INVENTION

In recent years, extensive studies have been made to put a lactic polymer having an excellent biodegradability into wide application as a general-purpose polymer. Many studies have been made of process for the preparation of such a lactic polymer. Further, many proposals for the process for the preparation of such a lactic polymer have been applied for patent. However, the conventional lactic acid or polylactic acid which is a polymer of lactides, or copolymer of lactide with other monomers leave something to be desired in formability or moldability and transparency. The polylactic acid is disadvantageous in that it decomposes too fast to handle as a general-purpose resin except in special applications. It has thus been keenly desired to improve these polylactic polymers.

International Disclosure No. WO 91/02015 discloses copolymers of an aromatic polyester such as polyethylene terephthalate and polybutylene terephthalate with polyglycolide or polylactic acid and processes for the preparation thereof.

The preparation processes disclosed in the above cited patent include a process which comprises the reaction of monomers, i.e., lactide, butylene glycol and dimethyl terephthalate, and a process which comprises the reaction of polymers, i.e., ester exchange reaction of two polymers, i.e., polyglycolide and polybutylene terephthalate, at a temperature as high as 220° C. However, preparation processes described in the examples are limited to the ester exchange reaction of polymers.

JP-A-4-504731 (The term "JP-A" as used herein means an "unexamined published Japanese patent application") discloses a process which comprises the polymerization of a lactide with a polyethylene terephthalate to prepare a blend polymer of a polylactic acid with a polyethylene terephthalate. Further, a technique for reacting a crystalline aromatic polyester with a lactone is disclosed in JP-B-48-4115 (The term "JP-B" as used herein means an "examined Japanese patent publication") and JP-B-48-4116. In accordance with these methods, a crystalline aromatic polyester is reacted with a lactone, particularly ε-caprolactone or γ-valerolactone.

However, the process disclosed in JP-A-4-504731 is disadvantageous in that the softening point of the polyethylene terephthalate is as high as not lower than 220° C., which is higher than the decomposition temperature of the lactide (185° C.), giving a remarkably colored copolymer having an insufficient molecular weight. Further, the process which comprises the reaction of lactones disclosed in JP-B-48-4115 and JP-B-48-4116 is disadvantageous in that the resulting copolymer is opaque and flexible and thus is not preferred as a molding resin.

It is generally well known that the preparation process which comprises the reaction of monomers, i.e., the reaction of a dicarboxylic acid component or its esterified product with a diol component and a cyclic ester such as lactide, cannot provide a higher molecular weight. Further, the preparation process which comprises the reaction of polymers is impractical in that the decomposition temperature of the polylactic acid is much lower than the temperature at which the aromatic polyester such as polyethylene terephthalate and polybutylene terephthalate becomes fluid.

Moreover, the resulting lactic copolymer polyester is brittle and exhibits a poor transparency because the aromatic polyester is crystalline and exhibits a high melt temperature and a poor compatibility with other compounds. JP-A-63-145661 proposes a process for the preparation of a copolymer of a lactide with an aliphatic polyester which comprises the polymerization of ε-caprolactone to obtain a homopolymer which is then block-copolymerized with a lactide.

However, the above-proposed process which comprises the block copolymerization of a poly(ε-caprolactone) with a lactide is disadvantageous in that the resulting copolymer becomes cloudy and opaque. This is probably because that the poly(ε-caprolactone) block and the polylactic acid block in the copolymer are hardly compatible with each other and the aliphatic polyester in the poly(ε-caprolactone) chain reflects a high crystallinity to opacify the copolymer. Further, the copolymer thus obtained normally stays flexible despite of its relatively high glass transition point determined by differential thermal analysis.

To summarize these conventional techniques, polymers provided with a sufficient strength, heat resistance and thermal stability exhibit an insufficient flexibility and transparency. On the contrary, polymers provided with a sufficient flexibility and transparency exhibit an insufficient strength, heat resistance and thermal stability. Thus, polymers provided with properties satisfactory enough for resins to be formed into film or sheet have not yet been obtained.

Further, if a lactide to be incorporated as a residual monomer is used as a plasticizer to plasticize the polymer, the remaining lactide sublimates, scatters and then attaches itself to the apparatus during preparation, contaminating the apparatus. Moreover, the lactide disappears from the polymer during storage or while in use, the desired plasticizing effect disappears and things wrapped by the wrapping material can be contaminated.

If an ordinary plasticizer is used instead of lactide, it must be used in a large amount to attain a sufficient plasticizing effect. Thus, the plasticizer unavoidably bleeds out, and the problems such as the disappearance of the desired plasticizing effect during storage and the contamination of things wrapped by the wrapping material could not be solved. Accordingly, polymers provided with properties satisfactory enough for the application as wrapping materials have not yet been obtained.

SUMMARY OF THE INVENTION

It is therefore an object of the present invention to provide a process for the preparation of a decomposable lactic copolymer polyester which exhibits a sufficiently high molecular weight, heat resistance and thermal stability and further exhibits a rigidity, flexibility and transparency depending on the purpose.

The foregoing object of the present invention will become more apparent from the following detailed description and examples.

The inventors made extensive studies to solve these problems. As a result, the following knowledges were obtained.

In some detail, the following processes are proposed:

A process which comprises the reaction, as essential components, of a lactide and a polyester comprising an aliphatic dicarboxylic acid component and/or aromatic dicarboxylic acid component and/or polyvalent carboxylic acid component having 3 or more functionalities and a diol component in various formulations;

A process which comprises the reaction, as essential components, of a lactide, a polyester comprising an aliphatic dicarboxylic acid component and/or aromatic dicarboxylic acid component and a diol component in various formulations and a polyvalent carboxylic acid having 3 or more functionalities;

A process which comprises the reaction, as essential components, of a polyester obtained by the reaction of a polyester comprising an aliphatic dicarboxylic acid component and/or aromatic dicarboxylic acid component and a diol component in various formulations and a polyvalent isocyanate having 2 or more functionalities and a lactide; or A process which comprises the reaction, as essential components, of a lactic copolymer polyester obtained by the reaction of a lactide with a polyester comprising an aliphatic dicarboxylic acid component and/or aromatic dicarboxylic acid component and a diol component in various formulations and a polyvalent isocyanate having 3 or more functionalities.

In accordance with the foregoing proposed processes, the decomposition of the monomers during forming or molding can be controlled. Forming and molding can be effected at wider temperature ranges. Further, the resulting polymer can be provided with a higher molecular weight. Accordingly, the polymer thus obtained can be provided with a higher strength and a higher thermal stability during forming or molding.

Further, the copolymerization of a hard hydrolyzable polylactic acid with a hydrophobic polyester can provide a less hydrolyzable polymer. Moreover, the proportion of the aliphatic dicarboxylic acid component and the aromatic dicarboxylic acid component can be arbitrarily varied or the proportion of the polyester to be copolymerized with these components can be arbitrarily varied to prepare various lactic polyester products ranging from a hard resin having a high glass transition point and melting point to a rigid and highly flexible resin having a tenacity which can be formed into a film that exhibits a high tear strength and can hardly be cracked.

Still further, the use of the polyvalent carboxylic acid having 3 or more functionalities or polyvalent isocyanate having 2 or more functionalities makes it easier to provide a higher molecular weight. This makes it possible to arbitrarily select the kind and proportion of copolymer polyesters. Accordingly, a decomposable high molecular lactic polyester can be obtained which exhibits a strength and molding thermal stability high enough for the application as a general-purpose resin and exhibits a sufficient rigidity, transparency and flexibility depending on the purpose. Thus, the present invention has been worked out.

The present invention concerns (1) a process for the preparation of a high molecular lactic copolymer polyester, which comprises allowing a lactide (A), a polyester terminated by hydroxyl group at both ends (B1), a polyvalent carboxylic acid having 3 or more functionalities and/or acid anhydride thereof (C) to undergo ring opening copolymerization in such an amount that the weight ratio of (A)/(B1) is from 50/50 to 98/2 and the proportion of the component (C) is from 0.001 to 5% by weight of the sum of the amount of the components (A) and (B1) in the presence of a ring opening polymerization catalyst (D).

The present invention also concerns (2) a process for the preparation of a high molecular lactic copolymer polyester, which comprises allowing a lactide (A) and a polyester terminated by hydroxyl group at both ends (B1) to undergo ring opening copolymerization in (A)/(B1) weight ratio of 50/50 to 98/2 in the presence of a ring opening polymerization catalyst (D) to prepare a polyester, and then reacting said polyester with a polyvalent carboxylic acid having 3 or more functionalities and/or acid anhydride thereof (C) in such an amount that the proportion of the component (C) is from 0.001 to 5% by weight of the sum of the amount of the components (A) and (B1).

The present invention further concerns (3) a process for the preparation of a high molecular lactic copolymer polyester, which comprises reacting a polyester terminated by hydroxyl group at both ends (B1) with a polyvalent carboxylic acid having 3 or more functionalities and/or acid anhydride thereof (C) in such an amount that the proportion of the component (C) is from 0.001 to 5% by weight of the amount of the component (B1) to obtain a polyester terminated by hydroxyl group at both ends having a weight-average molecular weight of from 10,000 to 300,000 (B2), and then allowing said polyester (B2) and a lactide (A) to undergo ring opening copolymerization in such an amount that the weight ratio of (A)/(B2) is from 50/50 to 98/2 in the presence of a ring opening polymerization catalyst (D).

The present invention concerns (4) a process for the preparation of a high molecular lactic copolymer polyester, which comprises allowing a dicarboxylic acid, a diol and a polyvalent carboxylic acid having 3 or more functionalities and/or acid anhydride thereof (C) in an amount of from 0.001 to 5% by weight to undergo dehydration reaction and/or deglycolation reaction to obtain a polyester having a weight-average molecular weight of from 10,000 to 300,000 (B3), and then allowing said polyester (B3) and a lactide (A) to undergo ring opening copolymerization in such an amount that the weight ratio of (A)/(B3) is from 50/50 to 98/2 in the presence of a ring opening polymerization catalyst (D).

The present invention still further concerns the process for the preparation of a high molecular lactic copolymer polyester as defined above, wherein the polyester terminated by hydroxyl group at both ends (B1) has a weight-average molecular weight of 10,000 to 200,000 and the polyvalent carboxylic acid having 3 or more functionalities and/or acid anhydride thereof (C) is selected from the group consisting of trimellitic acid, trimellitic anhydride, pyromellitic acid and pyromellitic anhydride.

The present invention concerns a process for the preparation of a high molecular lactic copolymer polyester, which comprises reacting a polyester terminated by hydroxyl group at both ends (B1) with a polyvalent isocyanate (E) having 2 or more functionalities in such an amount that the proportion of the component (E) is from 0.01 to 5% by weight of the amount of the polyester (B1) to obtain a polyester (B4) having a weight-average molecular weight of from 10,000 to 300,000, and then allowing said polyester (B4) and lactide (A) to undergo ring opening copolymerization in such an amount that the weight ratio of (A)/(B4) is from 50/50 to 98/2 in the presence of a ring opening polymerization catalyst (D).

The present invention further concerns a process for the preparation of a high molecular lactic copolymer polyester, which comprises allowing a lactide (A) and a polyester terminated by hydroxyl group at both ends (B1) to undergo ring opening copolymerization in such an amount that the weight ratio of (A)/(B1) is from 50/50 to 98/2 in the presence of a ring opening polymerization catalyst (D) to prepare a polyester having a weight-average molecular weight of from 10,000 to 300,000, and then reacting said polyester with a polyvalent isocyanate having 3 or more functionalities in such an amount that the proportion of said polyvalent isocyanate (F) is from 0.01 to 5% by weight of the sum of the amount of the components (A) and (B1).

The present invention still further concerns the process for the preparation of a high molecular lactic copolymer polyester as defined above, wherein the polyester terminated by hydroxyl group at both ends (B1) has a weight-average molecular weight of from 10,000 to 200,000.

The present invention concerns the process for the preparation of a high molecular lactic copolymer polyester as defined above, wherein the resulting high molecular lactic copolymer polyester has a weight-average molecular weight of from 20,000 to 600,000.

The present invention also concerns the process for the preparation of a high molecular lactic copolymer polyester as defined above, wherein a static mixer is used as a polymerization reaction vessel and a continuous polymerization apparatus comprising a series connection of two or more agitated reaction vessels is used.

Moreover, the present invention concerns a formed or molded product of a high molecular lactic copolymer polyester prepared by the preparation process as defined above.

DETAILED DESCRIPTION OF THE INVENTION

The present invention will be further described hereinafter.

The lactide, polyester terminated by hydroxyl group at both ends, polyvalent carboxylic acid having 3 or more functionalities, diisocyanate and polyvalent isocyanate having 3 or more functionalities as used herein will be sequentially further described hereinafter.

The lactide employable in the present invention is a compound obtained by the cyclic esterification of lactic acid between two molecules of the acid or a monomer having stereoisomers. Examples of the lactide employable in the present invention include L-lactide made of two L-lactic acids, D-lactide made of two D-lactic acids, and MESO-lactide made of L-lactic acid and D-lactic acid.

A copolymer comprising L-lactide or D-lactide alone crystallizes to exhibit a high melting point. The high molecular lactic polyester of the present invention comprises these three lactides in combination to realize desirable resin properties corresponding to the purpose.

In order to realize high thermophysical properties, the content of L-lactide is preferably not less than 75% of the total content of lactides. In order to realize still higher thermophysical properties, the content of L-lactide is preferably not less than 90% of the total content of lactides.

Examples of the polyester terminated by hydroxyl group at both ends (B) employable in the present invention include aromatic polyester made of aromatic dicarboxylic acid component and diol component, aliphatic polyester made of aliphatic dicarboxylic acid component and diol component, and aliphatic aromatic polyester made of aliphatic dicarboxylic acid component, aromatic dicarboxylic acid component and diol component.

The aromatic dicarboxylic acid component to be incorporated in the polyester employable in the present invention is not specifically limited. Specific examples of the aromatic dicarboxylic acid component include phthalic acid, isophthalic acid, terephthalic acid, naphthalenedicarboxylic acid, and phthalic anhydride. Other examples of the aromatic dicarboxylic acid component include esters of alcohols and diols with phthalic acid, isophthalic acid, terephthalic acid, naphthalenedicarboxylic acid, etc.

The aliphatic dicarboxylic acid component to be incorporated in the polyester employable in the present invention is not specifically limited. A $C_{4-14}$ aliphatic dicarboxylic acid is particularly preferred. Specific examples of such an aliphatic dicarboxylic acid include succinic acid, adipic acid, azelaic acid, sebacic acid, brassylic acid, and cyclohexanedicarboxylic acid. Besides these aliphatic dicarboxylic acids, dimer acids can be used.

As the diol component to be incorporated in the polyester there may be used any diol. Particularly preferred among these diols is a $C_{2-10}$ diol. Specific examples of such a diol include ethylene glycol, propylene glycol, butylene glycol, pentanediol, hexamethylene glycol, octanediol, neopentyl glycol, cyclohexanedimethanol, xylene glycol, diethylene glycol, triethylene glycol, dipropylene glycol, dibutanediol, 3-hydroxydipivalyl pivalate, and hydrogenated bisphenol A.

In order to enhance the transparency of the copolymer thus obtained, neopentyl glycol is preferably incorporated therein in an amount of not less than 20% by weight of the diol content. The molar ratio of the dicarboxylic acid component to the diol component is preferably about 1.

The high molecular lactic copolymer polyester obtained according to the present invention can be formed into a sheet having a strength ranging from a high value to a low value (flexible sheet). In some detail, a sheet having a tensile viscoelasticity of from 500 to 50,000 kg/cm$^2$ can be obtained.

In the present invention, both the aromatic polyester and the aliphatic polyester free of aromatic ring can be used as starting materials. In this case, too, both the polyesters preferably have a weight-average molecular weight as high as not less than 1,000, particularly from 10,000 to 200,000.

The weight ratio of the aromatic polyester to the aliphatic polyester is not limited. In order to maintain a practically sufficient strength, flexibility and transparency, the content of the aromatic polyester and the aliphatic polyester are preferably from 1 to 49 parts by weight and from 1 to 49 parts by weight based on 100 parts by weight of the sum of the amount of the aromatic polyester and the aliphatic polyester, respectively.

The aromatic polyester, aliphatic polyester and aromatic aliphatic polyester employable in the present invention each preferably exhibit a melting point or softening point, whichever lower, of not higher than 200° C., particularly from 80° to 190° C. The aromatic polyester may be either crystalline or amorphous but is preferably transparent.

A commercially available polyethylene terephthalate for general purpose normally exhibits a softening point of 220° to 255° C. that is not suited for the preparation process of the present invention. When a special polyethylene terephthalate having a softening point as low as not higher than 200° C. is used in the process for the preparation of the copolymer of the present invention, a non-colored high molecular excellent lactic copolymer can be obtained. The melting point as defined herein is determined by differential scanning calorimetric analysis (DSC).

In the present invention, a high molecular lactic polyester having a higher molecular weight can be provided by subjecting at least one polyvalent carboxylic acid and/or acid anhydride thereof in combination to esterification. Further, since branches are introduced into the polyester, the molecular-weight distribution of the polyester is widened. Moreover, a metal reacts with a carboxyl group having 1 or more functionalities in the polyvalent carboxylic acid and/or acid anhydride thereof to ionomerize the polymer. As a result, the polyester can be formed into a film or sheet having excellent physical properties.

Examples of the polyvalent carboxylic acid having 3 or more functionalities and/or acid anhydride thereof include trimesic acid, propanetricarboxylic acid, trimellitic acid, trimellitic anhydride, pyromellitic acid, pyromellitic anhydride, benzophenonetetracarboxylic anhydride, cyclopentatetracarboxylic anhydride, 1,3,5-cyclohexanetricarboxylic acid, cyclohexanetetracarboxylic acid, and cyclohexanetetracarboxylic anhydride. Particularly preferred among these compounds are trimellitic anhydride, and pyromellitic anhydride. These polyvalent carboxylic acid and/or acid anhydride thereof may be used in admixture as necessary.

The polyfunctional isocyanate as used herein preferably has two or more isocyanate groups, particularly only isocyanate groups as functional groups. In order that the resulting urethane bond-containing lactic polyester substantially has a linear structure, a bifunctional isocyanate is preferred.

Specific examples of such an isocyanate include hexamethylene diisocyanate, tolylene-2,4-diisocyanate, tolylene-2,5-diisocyanate, toluene diisocyanate, xylylene diisocyanate, diphenylmethane diisocyanate, 1,5-naphthylene diisocyanate, isophorone diisocyanate, hydrogenated diphenylmethane diisocyanate, diisocyanate-modified polyether, diisocyanate-modified polyester, and mixture thereof.

In order to obtain an urethane-containing lactic copolymer polyester which exhibits a high thermal stability during formation, a polyfunctional isocyanate having 3 or more functionalities can be preferably used in particular.

In this case, the resulting polymer is branched. In order to obtain such a polymer, a compound obtained by modifying a polyvalent alcohol by a bifunctional isocyanate, e.g., bifunctional isocyanate-modified pentaerythritol, the foregoing polyvalent isocyanate-modified polyether, similar polyvalent isocyanate-modified polyester, etc. can be used.

As the polyfunctional isocyanate (E) employable in the present invention there can be used a combination of several polyfunctional isocyanates. For example, a small amount of an isocyanate having 3 or more functionalities may be used in combination with a bifunctional isocyanate to cause reaction without gelation, making it possible to provide a higher molecular weight.

Preferred conditions of the polyester terminated by hydroxyl group at both ends, the polyvalent carboxylic acid having 3 or more functionalities, the diisocyanate, the polyvalent isocyanate having 3 or more functionalities and the desired high molecular lactic copolymer polyester according to the present invention will be described hereinafter.

The polyester terminated by hydroxyl group at both ends (B1) preferably has a weight-average molecular weight of from 10,000 to 200,000 or a number-average molecular weight of from 5,000 to 100,000 for the purpose of increasing the molecular weight of the resulting lactic copolymer.

From the standpoint of the solubility and ease of preparation of the polyester terminated by hydroxyl group at both ends, the polyester terminated by hydroxyl group at both ends (B1) preferably has a Weight-average molecular weight of from 20,000 to 100,000 or a number-average molecular weight of from 10,000 to 50,000.

The ratio of the lactide (A) to the polyester terminated by hydroxyl group at both ends (B1) is preferably from 50/50 to 98/2 to raise the molecular weight of the resulting high molecular lactic copolymer. More preferably, the ratio of (A)/(B1) is from 65/35 to 98/2 to enhance the transparency of the resulting high molecular lactic copolymer.

The proportion of the polyvalent carboxylic acid having 3 or more functionalities and/or acid anhydride thereof (C) in the preparation process as defined above (1) and (2) is preferably from 0.001 to 5% by weight based on 100% by weight of the sum of the amount of the lactide (A) and the polyester terminated by hydroxyl group at both ends (B1). More preferably, the proportion of the polyvalent carboxylic acid having 3 or more functionalities and/or acid anhydride thereof (C) is from 0.001 to 0.1% by weight to enhance the molecular weight and flexibility of the resulting high molecular lactic copolymer.

The polyester terminated by hydroxyl group at both ends (B2) obtained by the reaction of the polyvalent carboxylic acid having 3 or more functionalities and/or acid anhydride thereof (C) with the polyester terminated by hydroxyl group at both ends (B1) preferably has a weight-average molecular weight of from 10,000 to 300,000 for the purpose of increasing the molecular weight of the resulting lactic copolymer.

From the standpoint of the solubility and ease of preparation of the polyester terminated by hydroxyl group at both ends, the polyester preferably has a weight-average molecular weight of from 20,000 to 150,000 or a number-average molecular weight of from 10,000 to 80,000.

The ratio of the lactide (A) to the polyester terminated by hydroxyl group at both ends (B2) is preferably from 50/50 to 98/2 to raise the molecular weight of the resulting high molecular lactic copolymer. More preferably, the ratio of (A)/(B2) is from 65/35 to 98/2 to enhance the transparency of the resulting high molecular lactic copolymer.

The proportion of the polyvalent carboxylic acid having 3 or more functionalities and/or acid anhydride thereof (C) in the preparation process as defined above (3) is preferably from 0.001 to 5% by weight based on 100% by weight of the polyester terminated by hydroxyl group at both ends (B1). More preferably, the proportion of the polyvalent carboxylic acid having 3 or more functionalities and/or acid anhydride thereof (C) is from 0.001 to 0.1% by weight, particularly from 0.001 to 0.1% by weight to enhance the molecular weight and flexibility of the resulting high molecular lactic copolymer.

The high molecular polyester terminated by hydroxyl group at both ends (B3) obtained by allowing the polyvalent carboxylic acid having 3 or more functionalities and/or acid anhydride thereof (C), the dicarboxylic acid and the diol to undergo dehydration reaction and deglycolation reaction preferably has a weight-average molecular weight of from 10,000 to 300,000 or a number-average molecular weight of from 10,000 to 100,000 for the purpose of increasing the molecular weight of the resulting lactic copolymer.

More preferably, the resulting high molecular polyester (B3) has a weight-average molecular weight of from 20,000 to 150,000 or a number-average molecular weight of from 10,000 to 50,000 from the standpoint of the solubility and ease of preparation thereof.

The ratio of the lactide (A) to the polyester terminated by hydroxyl group at both ends (B3) is preferably from 50/50 to 98/2 to raise the molecular weight of the resulting high molecular lactic copolymer. More preferably, the ratio of (A)/(B3) is from 65/35 to 98/2 to enhance the transparency of the resulting high molecular lactic copolymer.

The proportion of the polyvalent carboxylic acid having 3 or more functionalities and/or acid anhydride thereof (C) in the polyester terminated by hydroxyl group at both ends (B3) is preferably from 0.001 to 5% by weight based on 100% by weight of the total weight of the dicarboxylic acid or acid anhydride thereof. More preferably, the proportion of the polyvalent carboxylic acid having 3 or more functionalities and/or acid anhydride thereof (C) is from 0.01 to 1% by weight to enhance the molecular weight and flexibility of the resulting high molecular lactic copolymer.

The polyester (B4) obtained by the reaction of the polyester terminated by hydroxyl group at both ends (B1) with the polyvalent isocyanate having 2 or more functionalities (E) preferably has a weight-average molecular weight of from 10,000 to 300,000 or a number-average molecular weight of from 10,000 to 100,000 for the purpose of increasing the molecular weight of the resulting lactic copolymer.

More preferably, the resulting high molecular polyester (B4) has a weight-average molecular weight of from 20,000 to 150,000 or a number-average molecular weight of from 10,000 to 50,000 from the standpoint of the solubility and ease of preparation thereof.

The ratio of the lactide (A) to the polyester terminated by hydroxyl group at both ends (B4) containing the polyvalent isocyanate having 2 or more functionalities (E) is preferably from 50/50 to 98/2 to raise the molecular weight of the resulting high molecular lactic copolymer polyester. More preferably, the ratio of (A)/(B4) is from 65/35 to 98/2 to enhance the transparency of the resulting high molecular lactic copolymer.

The proportion of the polyvalent isocyanate having 2 or more functionalities (E) is preferably from 0.01 to 5% by weight based on the weight of the polyester terminated by hydroxyl group at both ends (B1). More preferably, the proportion of the polyvalent isocyanate having 2 or more functionalities (E) is from 0.1 to 3% by weight to enhance the molecular weight and flexibility of the resulting high molecular lactic copolymer.

In the case where the lactide (A) and the polyester terminated by hydroxyl group at both ends (B1) are allowed to undergo ring opening copolymerization in the presence of a ring opening polymerization catalyst (D) to prepare a polyester having a weight-average molecular weight of from 10,000 to 300,000 which is then reacted with a polyvalent isocyanate having 3 or more functionalities (F), the proportion of the polyvalent isocyanate having 3 or more functionalities (F) is preferably from 0.01 to 5% by weight, more preferably from 0.1 to 3% by weight based on the sum of the amount of the lactide (A) and the polyester terminated by hydroxyl group at both ends (B1) to raise the molecular weight and flexibility of the resulting high molecular lactic copolymer.

The desired high molecular lactic copolymer polyester preferably has a weight-average molecular weight of from 20,000 to 600,000 or a number-average molecular weight of from 10,000 to 300,000. Taking into account the fact that the high molecular lactic copolymer polyester exhibits a reduced molecular weight when formed or molded, the workability thereof or the physical properties such as strength of the formed or molded product, the high molecular lactic copolymer polyester preferably has a weight-average molecular weight of from 50,000 to 500,000 or a number-average molecular weight of from 30,000 to 250,000.

The polymerization reaction is preferably effected in the presence of a ring opening polymerization catalyst (D). Examples of the ring opening polymerization catalyst (D) employable in the present invention include cyclic ester ring opening polymerization catalysts, metals such as tin, zinc, lead, titanium, bismuth, zirconium and germanium and derivatives thereof which are known as ester exchange catalysts, etc. These metal derivatives can be used as catalysts of the present invention. Particularly preferred among these metal derivatives are organic metallic compounds, metallic carbonates, metallic oxides, metallic halides, etc. Specific examples of these metal derivatives include tin octanoate, tin chloride, zinc chloride, zinc acetate, lead oxide, lead carbonate, titanium chloride, alkoxytitanium, germanium oxide, and zirconium oxide.

The amount of the ring opening polymerization catalyst (D) is preferably from 0.005 to 0.2% by weight based on 100% by weight of the sum of the amount of the lactide (A) and the polyester terminated by hydroxyl group at both ends ((B1), (B2), (B3), or (B4)) and/or the polyvalent carboxylic acid having 3 or more functionalities and/or acid anhydride thereof (C) or the polyvalent isocyanate having 2 or more functionalities (E) or the polyvalent isocyanate having 3 or more functionalities (F). In order to provide a sufficiently high polymerization rate and minimize the coloring of the resulting lactic polyester, the amount of the ring opening polymerization catalyst (D) is particularly preferably from 0.01 to 0.1% by weight.

In the case where the polyvalent carboxylic acid having 3 or more functionalities and/or acid anhydride thereof (C) is reacted with the polyester terminated by hydroxyl group at both ends (B1) or the polyvalent carboxylic acid having 3 or more functionalities and/or acid anhydride thereof (C), the dicarboxylic acid and the diol are allowed to undergo dehydration reaction and deglycolation reaction to prepare a polyester, a catalyst is preferably used.

As the catalyst employable in the present invention there may be used any catalyst generally known as an esterification catalyst. Examples of such a catalyst include organic or inorganic compounds of at least one metal selected from the group consisting of tin, zinc, lead, titanium, antimony, cerium, germanium, cobalt, manganese, iron, aluminum, magnesium, calcium and strontium. For example, metal alkoxides, organic acid salts of metal, chelates, metal oxides, etc. may be used. Particularly useful among these compounds is organic titanium compound such as alkylester titanate, titanium oxy acetyl acetonate, and titanium oxalate.

The added amount of the catalyst is preferably from 0.001 to 0.5% by weight based on 100% by weight of the sum of the polyvalent carboxylic acid having 3 or more functionalities and/or acid anhydride thereof (C), the dicarboxylic acid or acid anhydride thereof and the diol. In order to provide a sufficiently high polymerization rate and minimize the coloring of the resulting lactic polyester, the added amount of the catalyst is particularly preferably from 0.01 to 0.1% by weight.

In the case where the polyvalent isocyanate having 2 or more functionalities (E) or the polyvalent isocyanate having 3 or more functionalities (F) is used, a catalyst is preferably used. As the catalyst employable in the present invention there may be used any catalyst generally known as an urethanation catalyst. Examples of such an urethanation catalyst include organic or inorganic compounds of at least one metal selected from the group consisting of tin, zinc, lead and titanium. For example, metal alkoxides, organic acid salts of metal, chelates, metal oxides, etc. may be used. Particularly useful among these compounds is organic tin compound such as dibutyltin dilaurate and tin octanoate.

Specific examples of the preparation process will be sequentially described hereinafter.

In the case where the lactide (A) and the polyester ((B1), (B2), (B3) or (B4)) are polymerized as essential components, the polymerization temperature is preferably from not lower than the melting point of the lactide to not higher than 185° C. in the light of the balance of polymerization. If the polymerization temperature falls within this range, the coloring of the lactic polyester due to the decomposition reaction can be inhibited. Since the melting point of the lactide is near 100° C. the polymerization temperature is preferably from not lower than 100° C. to not higher than 185° C., more preferably from 145° C. to 180° C. in the light of the balance of polymerization. Thus, the lactic polyester can be prevented from the reduction of molecular weight or coloring due to decomposition reaction.

In the case where the lactide (A), the polyester terminated by hydroxyl group at both ends (B1) and the polyvalent carboxylic acid having 3 or more functionalities and/or acid anhydride thereof (C) are mixed at once before polymerization, the mixture is heated and melted or stirred with a solvent, followed by the addition of the ring opening polymerization catalyst (D).

In this case, since the lactide (A), the polyester terminated by hydroxyl group at both ends (B1) and the polyvalent carboxylic acid having 3 or more functionalities and/or acid anhydride thereof (C) can be subjected to polymerization at one time, rapid reaction is possible and thus this process is particularly preferred from the standpoint of production property.

In the case where the lactide (A) and the polyester terminated by hydroxyl group at both ends (B1) are allowed to undergo ring opening copolymerization in the presence of a ring opening polymerization catalyst (D) to prepare a high molecular lactic copolymer polyester having a weight-average molecular weight of from 10,000 to 300,000 which is then reacted with the polyvalent carboxylic acid having 3 or more functionalities and/or acid anhydride thereof (C), the mixture of the lactide (A) and the polyester (B1) is heated and melted or stirred in the presence of a solvent, followed by the addition of the ring opening polymerization catalyst (D).

The reaction of the high molecular lactic copolymer polyester with the polyvalent carboxylic acid having 3 or more functionalities and/or acid anhydride thereof (C) is, when the polymerization is effected in the absence of solvent, conducted at a temperature of from 100° C. to 210° C. for from 10 to 180 minutes with stirring. In this case, the reaction can be advantageously effected under reduced pressure to provide a higher reaction rate. On the other hand, in the case where the polymerization is effected in the presence of a solvent, the polymerization is preferably effected at a temperature of from 80° C. to 210° C. for from 10 to 180 minutes. The reaction may be effected optionally in the presence of a catalyst.

The foregoing process differs from the process which comprises the reaction of a condensed polyester of a hydroxycarboxylic acid such as polylactic acid with a polyvalent carboxylic acid and/or acid anhydride thereof. In the process of the present invention, the polyester to be reacted with the polyvalent carboxylic acid having 3 or more functionalities and/or acid anhydride thereof (C) is terminated by hydroxyl group at both ends. Thus, many reactive end groups can take part in the reaction. Therefore, all the polymer chains can be advantageously connected to each other.

In the case where the polyvalent carboxylic acid having 3 or more functionalities and/or acid anhydride thereof (C) is reacted with the polyester terminated by hydroxyl group at both ends (B1), followed by the copolymerization with the lactide (A), the polyester terminated by hydroxyl group at both ends (B1) is prepared, and the polyvalent carboxylic acid having 3 or more functionalities and/or acid anhydride thereof (C) is then heated and melted with the polyester (B1) or mixed with the polyester (B1) in the presence of a solvent, optionally followed by the addition of a catalyst, before reaction.

In the case where the polymerization is effected in the absence of solvent, the polymerization is effected at a temperature of from 100° C. to 210° C. for from 10 to 180 minutes with stirring. In this case, the reaction can be advantageously effected under reduced pressure to provide a higher reaction rate. In the case where the polymerization is effected in the presence of a solvent, the polymerization is preferably effected at a temperature of from 80° C. to 210° C. for from 10 to 180 minutes. In the case where the polymerization product and the polyester terminated by hydroxyl group at both ends (B2) obtained by the reaction of the lactide (A) with the polyvalent carboxylic acid having 3 or more functionalities and/or acid anhydride thereof (C) are mixed for polymerization, the mixture is heated and melted or stirred with a solvent, followed by the addition of the ring opening polymerization catalyst (D).

In accordance with the foregoing process, when the polymerization product is polymerized with the polyester terminated by hydroxyl group at both ends obtained by the reaction of the lactide with the polyvalent carboxylic acid having 3 or more functionalities and/or acid anhydride thereof, an ester exchange reaction occurs to obtain a homogeneous copolymer.

In the case where the polyvalent carboxylic acid having 3 or more functionalities and/or acid anhydride (C) is allowed to undergo dehydration reaction and deglycolation reaction with the dicarboxylic acid and the diol, followed by the copolymerization with the lactide (A), the dehydration reaction of the polyvalent carboxylic acid having 3 or more functionalities and/or acid anhydride thereof (C) with the dicarboxylic acid and the diol is preferably effected at a temperature of from 160° C. to 250° C. for from 5 to 16 hours in an atmosphere of inert gas.

The deglycolation reaction is effected under a reduced pressure of not higher than 5 Torr at a temperature of from 170° C. to 260° C. for from 2 to 16 hours. The polyester terminated by hydroxyl group at both ends (B3) thus obtained and the lactide (A) are heated and melted or mixed in the presence of a solvent, followed by the addition of the ring opening polymerization catalyst (D).

In the case where the polyvalent isocyanate having 2 or more functionalities (E) is reacted with the polyester terminated by hydroxyl group at both ends (B1), followed by the copolymerization with the lactide (A), the polyvalent isocyanate having 2 or more functionalities (E) is heated and melted with the polyester terminated by hydroxyl group at both ends (B1) or mixed with the polyester (B1) in the presence of a solvent, optionally followed by the addition of a catalyst, before the preparation of the polyester (B4).

The foregoing reaction is preferably effected at a temperature of from 80° C. to 210° C. for from 10 to 180 minutes with stirring. In the case where the lactide (A) and the polyester (B4) are mixed for polymerization, the mixture is heated and melted or stirred in the presence of a solvent, followed by the addition of a ring opening polymerization catalyst (D). In this process, when the lactide and the polyester (B4) are mixed, an ester exchange reaction occurs to obtain a homogeneous copolymer.

In the case where the lactide (A) and the polyester terminated by hydroxyl group at both ends (B1) are allowed to undergo ring opening copolymerization in the presence of a ring opening polymerization catalyst (D) to prepare a high molecular lactic copolymer polyester having a weight-average molecular weight of from 10,000 to 300,000 which is then reacted with the polyvalent isocyanate having 3 or more functionalities (F), the mixture of the lactide (A) and the polyester (B1) is heated and melted or stirred in the presence of a solvent, followed by the addition of the ring opening polymerization catalyst (D).

The reaction of the high molecular lactic copolymer polyester with the polyvalent isocyanate having 3 or more functionalities (F) follows the heating and melting of the mixture of the polymerization product with the polyvalent isocyanate (F) or the stirring of the mixture in the presence of a solvent. The reaction is preferably effected at a temperature of from 80° C. to 210° C. for from 10 to 180 minutes. The reaction may be effected optionally in the presence of a catalyst.

The foregoing process differs from the process which comprises the reaction of a condensed polyester of a hydroxycarboxylic acid such as polylactic acid with a polyvalent carboxylic acid and/or acid anhydride thereof. In the process of the present invention, the polyester to be reacted with the polyvalent isocyanate having 3 or more functionalities (F) is terminated by hydroxyl group at both ends. Thus, many reactive end groups can take part in the reaction. Therefore, all the polymer chains can be advantageously connected to each other.

The high molecular lactic copolymer polyester obtained by the foregoing preparation process has a weight-average molecular weight of from 20,000 to 600,000 to maintain its formability or moldability and the strength or flexibility of the formed or molded product. Taking into account the reduction of the molecular weight during formation, the high molecular lactic copolymer polyester preferably has a weight-average molecular weight of from 50,000 to 600,000.

In order to prevent the decomposition and coloring of the lactide, the optimum atmosphere in which the polymerization thereof and the reaction thereof with the polyvalent carboxylic acid having 3 or more functionalities and/or acid anhydride thereof (C), the polyvalent isocyanate having 2 or more functionalities (E) or the polyvalent isocyanate having 3 or more functionalities (F) can occur is a dried inert gas. In particular, the reaction is preferably effected in an atmosphere of nitrogen or argon gas or with such an inert gas bubbled thereinto. At the same time, the polyester terminated by hydroxyl group at both ends ((B1), (B2), (B3) or (B4)) or mixture thereof as a starting material is preferably dehydrated and dried before use.

Since the lactide is soluble in a solvent, it can be polymerized in the presence of a solvent. Examples of the solvent employable herein include benzene, toluene, ethylbenzene, xylene, cyclohexanone, methyl ethyl ketone, and isopropyl ether.

The high molecular lactic copolymer polyester of the present invention can be prepared by means of an ordinary polymerization vessel. However, since the viscosity of the polyester is raised as the molecular weight of the polyester is increased, the copolymerization reaction in such an ordinary polymerization vessel is liable to the inhibition of agitation that causes local heating resulting in local denaturation. Further, when the copolymerization product is withdrawn from the polymerization vessel, the product can be attached to the wall of the vessel or the agitating blade, causing the drop of yield. The yield and productivity can be enhanced by employing a continuous preparation process.

In an example of the continuous preparation process, a series connection of two or more agitated reaction vessels which can vary in the manner of agitation with the progress of reaction and thus can provide an efficient temperature control is preferably used since the starting materials of the high molecular lactic copolymer polyester of the present invention have a low viscosity and the resulting polymer resin which shows a vigorous change in the viscosity to as high as over 10,000 poise and is liable to thermal decomposition finds extremely great difficulty in temperature control.

In the foregoing continuous polymerization process employing a series connection of two or more agitated reaction vessels, a plurality of agitated reaction vessels are connected in series. In operation, the polymerization reaction is allowed to proceed to a certain extent in the first reaction vessel. The resulting product is transferred to the subsequent reaction vessel where it is then further allowed to undergo reaction. If necessary, the resulting product is then transferred to the subsequent reaction vessel for further reaction. In this process, it is likely that the starting materials can be mixed into the product in unreacted form. In order to solve this problem, the number of reaction vessels is preferably increased.

The agitated reaction vessel as defined herein is a dynamic mixer equipped with an agitator. More particularly, it is a reaction vessel equipped with an agitator having agitating blades connected to a power machine.

Referring to the shape of the agitating blade in the agitated reaction vessel used in the continuous reaction process employing a multiple of reaction vessels, agitation can be fairly effected regardless of the shape of the agitating blade in the reaction vessel used in the initial stage of reaction because the resulting viscosity is low. However, a turbine blade, a Pfaudler type impeller, a helical ribbon blade or a multi-stage blade consisting of these blades is preferably used for the purpose of efficiently producing upward and downward flows in the reaction vessel.

A blade which can homogeneously agitate the entire reaction system such as anchor blade is preferred. A high viscosity is developed in the reaction vessels used in the middle stage and final stage of the reaction. Thus, the shape of the agitating blade has a great effect on the agitating effect. Agitation can be hardly effected particularly in the vicinity of the wall of the reaction vessel. For the purpose of efficiently scratch the reaction product off the wall of the reaction vessel, a blade which can homogeneously agitate the entire reaction system such as turbine blade, helical ribbon blade and anchor blade is preferred.

In the case where starting materials are supplied into the reaction system while withdrawing the same amount of the reaction product, the more the total number of reaction vessels is, the less is the amount of unreacted starting materials to be mixed into the reaction product. Further, the required capacity of the reaction vessel is reduced, lowering the required agitating power in each reaction vessel and hence facilitating the temperature control with a heating medium. However, the more the number of reaction vessels is, the more is the required number of power machines, and the more is the required number of pumps connecting reaction vessels. Thus, the control is more complicated.

Since the complication of the apparatus is economically disadvantageous, the number of agitated reaction vessels used should be predetermined as small as possible so far as a sufficient agitating effect can be exerted. If the capacity of the reaction vessel is excessive as compared with the supplied amount of the starting materials, it is thought that two or more reaction vessels suffice. However, such an excessive capacity of the reaction vessel as compared with the supplied amount of the starting materials is economically disadvantageous, and it is thought that the required number of reaction vessels is 3 or more. Further, the complication of the apparatus caused by the increase in the number of reaction vessels is not desirable from the standpoint of operation and economy, and the number of reaction vessels is preferably from 3 to 5.

An example of agitated reaction vessel is a latent heat cooling type agitated reaction vessel. This is a reaction vessel which can utilize the heat of vaporization of the monomer as starting material or solvent to control the reaction temperature. When the starting material is charged into the reaction vessel, a space is produced at the top of the reaction vessel. The heat dispersion caused by the evaporation from the liquid surface to the space makes cooling possible. Thus, the temperature control is easily made, making it possible to predetermine the reaction temperature to a high value and hence realize a high productivity. A condenser for catching the monomer and/or solvent is provided at the top of the reaction vessel.

In this arrangement, the transfer of the solution from one reaction vessel to the subsequent reaction vessel requires a pump every vessel. The starting material is supplied into a first agitated reaction vessel by means of a pump. The reaction solution is then transferred from the first vessel to a second vessel by means of another pump. The reaction solution is then transferred from the second vessel to a third vessel by means of another pump, and so on.

Another example of the agitated reaction vessel is a filling type agitated reaction vessel. This is an apparatus comprising a series connection of a multiple of reaction vessels between which the reaction solution is transferred by means of a single pump. A single pump may be used to feed the starting material into the reaction vessels. Further, the reaction can be effected in a closed system. Thus, the charging of starting material, reaction, degasification and polymer pelletization can be effected without coming into contact with the external atmosphere. This is an advantage which cannot be obtained by the conventional batch type reaction vessel. Thus, this is a continuous polymerization process extremely suitable for the preparation of a decomposable polymer of the present invention which can be decomposed by heat, oxygen or water content.

As another example of the continuous production process there is preferably used one employing a static mixer.

The term "static mixer" as used herein is meant to indicate a static mixing machine free of mobile portion, i.e., agitator, as opposed to mixing machine equipped-with agitator. More particularly, it is a mixer equipped with a mobile portion-free mixing element fixed in a pipe. The mixing element is adapted to split the flow and change or invert the direction of flow. Thus, the flow is divided axially or crosswise, and its direction is then changed or inverted. This procedure is repeated to mix the solution. Some static mixers are equipped with a jacket at around the pipe for heat exchange. In some static mixers, the mixing element is equipped with a heat exchange tube through which a heating medium passes.

The static mixer is generally tubular. It comprises a linear connection of a plurality of static mixers. In operation, the starting material is continuously supplied through an intake in an atmosphere of inert gas so that the resulting polymer continuously moves in the static mixer. In this manner, the operation can be continuously effected without coming into contact with the external atmosphere through the procedure consisting of the charging of starting material, polymerization, degasification, and polymer pelletization.

In the preparation of the high molecular lactic copolymer polyester of the present invention, the polymerization apparatus equipped with a static mixer can be singly used to effect all polymerization reactions. However, the static mixer can be arranged such that polymerization is effected by a polymerization vessel equipped with an ordinary agitator in the initial stage of polymerization where a relatively low polymer viscosity is developed while polymerization is effected by a polymerization apparatus equipped with a static mixer in the latter stage of polymerization where a high polymer viscosity is developed to exert a remarkable agitating effect particularly in the latter stage of polymerization where a high polymer viscosity is developed. Therefore, a continuous polymerization apparatus comprising a static mixer connected to an agitated polymerization vessel may be used.

The lactide, the polyester polymer and the resulting high molecular polyester can be easily solved in solvents. Therefore, polymerization can be effected with a solvent. The resulting high molecular lactic polyester exhibits a high melting point and a high melt viscosity and thus can hardly be polymerized. However, when provided with a solvent, the polymerization system exhibits a reduced viscosity and thus can be easily stirred and hence polymerized.

In particular, the use of the continuous polymerization apparatus equipped with a static mixer requires a reduced extrusion pressure of the polymerization solution or can simplify the arrangement of a polymerization apparatus equipped with an internal device for heating medium for the purpose of controlling temperature or a turning blade for the purposed of agitation.

Further, since the foregoing continuous polymerization apparatus can provide easy agitation, the temperature control can be easily effected, uniformalizing temperature therein. Thus, a less colored lactic polyester can be obtained.

For the reaction with the polyvalent carboxylic acid having 3 or more functionalities and/or acid anhydride thereof (C) or the polyvalent isocyanate (E) or (F), a line may be provided such a manner that the reaction component (C), (E) or (F) is added at its proper addition time.

Preferred examples of the solvent employable herein include benzene, toluene, ethylbenzene, xylene, cyclohexanone, methyl ethyl ketone, methyl isobutyl ketone, and isopropyl ether. If the polymerization is effected with such a solvent, the polymerization rate is lowered. For the purpose of overcoming this difficulty, the polymerization temperature is preferably from 140° C. to 195° C.

The polymerization or reaction with the polyvalent carboxylic acid having 3 or more functionalities and/or acid anhydride thereof (C) or polyvalent isocyanate ((E) or (F)) can be inhibited by water content. Further, a decomposition reaction is accelerated. Thus, the polymerization or reaction is preferably effected in an atmosphere of dried inert gas. In particular, the polymerization or reaction is preferably effected in an atmosphere of nitrogen or argon gas or in a stream of inert gas.

For the purpose of removing the lactide, solvent and malodorous substances remaining in the latter stage of polymerization, degasification is preferably effected under reduced pressure. The gasification process can reduce the content of remaining lactide, making it possible to remarkably enhance the storage stability of the resulting high molecular lactic polyester.

The remaining lactide causes some troubles on the high molecular lactic polymer in sheet form. For example, the remaining lactide causes water content to be attached to the sheet. The water content thus attached causes the hydrolysis of the sheet. Further, the remaining lactide causes the sheet to be fused due to heat. Moreover, the remaining lactide can sublimate and scatter from the film sheet made of the high molecular lactic polymer. Therefore, the content of the remaining lactide in the high molecular lactic polyester of the present invention is preferably not more than 2% by weight, more preferably not more than 1% by weight.

In some detail, degasification is preferably effected by withdrawing the resulting polymer while being heated under reduced pressure. In order to inhibit the reduction of the molecular weight of the high molecular lactic polyester, degasification is preferably effected at a temperature of from 145° C. to 230° C. for from 2 to 30 minutes under a pressure of from 0.1 to 200 Torr. Alternatively, degasification may be effected by pelletizing or grinding the high molecular lactic polyester thus polymerized, and then withdrawing the polyester while being heated under reduced pressure.

In order to inhibit the reduction of the molecular weight of the high molecular lactic polyester, degasification is preferably effected at a temperature of from 60° to 200° C. under a pressure of from 0.1 to 50 Torr for from 2 to 400 minutes. This gasification process can reduce the content of the remaining lactide, which is normally about 2.5%, to not more than 1.0%, even to not more than 0.1% as necessary.

During the preparation of the copolymer of the present invention, cyclic esters other than the lactide (A) may be added to prepare a high molecular lactic polyester. In particular, a lactone may be added in an amount of from 1 to 20% by weight for the purpose of softening the resulting polyester.

The cyclic esters to be added other than the lactide are not specifically limited. Specific examples of these cyclic esters include cyclic dimers of hydroxy acid such as glycolide, and inner lactides such as ε-caprolactone, γ-valerolactone and γ-undecalactone. The more the content of lactone is, the lower is the glass transition point and the melting point of the resulting polyester, and the higher is the flexibility thereof.

The preparation process of the present invention can provide products ranging from a high molecular lactic polyester having a high rigidity to a high molecular lactic polyester having a high flexibility. Examples of these products include polymers useful as general-purpose resins having decomposability and a tensile elasticity modulus of from 500 to 50,000 $kg/cm^2$, such as resin for wrapping material (e.g., sheet, film), foamable resin, extrudable resin, injection-moldable resin, ink resin and laminating resin. The preparation process of the present invention is particularly useful for the preparation of polymers for wrapping material.

The lactic copolymer polyester of the present invention can be easily extruded by T-die casting or tubular film process so that it is formed into sheet or film. Since the lactic copolymer polyester has a high hygroscopicity and thus is liable to hydrolysis, it can be easily formed into a wrapping material such as sheet or film by means of an ordinary single-screw extruder. However, the water content should be carefully controlled.

As the screw to be used in the extruder there may be used an ordinary full-frighted screw having L/D of from about 20 to 30. The screw may be optionally vented. In the case where a single-screw extruder is used, dehumidification is preferably effected by a vacuum dryer or the like so that the water content in the starting material is controlled to not more than 50 ppm to avoid hydrolysis in the extruder. The optimum extrusion temperature depends on the molecular weight of the lactic copolymer polyester used and the amount of remaining lactide but is preferably not lower than the flow initiation temperature.

In the T-die casting process, the sheet or film thus extruded is normally cooled over a temperature-controlled mirror-like surface or textured roll. In this process, an air knife may be used. Further, if a vented two-screw extruder is used, a high dehydration effect can be exerted, eliminating the necessity for pre-drying and hence enabling an efficient film formation. The tubular film process can be easily effected by means of an ordinary forming apparatus equipped with a circular die or air ring. There is no need of special accessory apparatus. In order to provide a uniform section, the die, air ring or winder may be rotated.

The sheet or film thus formed may be monoaxially or biaxially oriented at a temperature of from not lower than the glass transition temperature thereof to not higher than the melting point thereof by a tentering method or tubular film process. The sheet or film thus oriented can be provided with molecular orientation that improves the physical properties such as impact resistance, rigidity and transparency thereof.

The orientation may be effected simultaneously or successively. The orientation speed is not specifically limited. The stretch ratio is not specifically limited. In the case of biaxial orientation, the optimum stretch ratio is normally from 2 to 4 in both lengthwise direction and crosswise direction. For films which need to be shrinked upon heating such as shrink film, a stretch ratio as high as from 3 to 6 is desirable in one direction or two directions. In order to enhance the heat resistance of the sheet or film, the sheet or film which has been oriented may be subjected to heat setting for the removal of stress or acceleration of crystallization.

During the formation of sheet or film, an ordinary filler such as inorganic filler (e.g., talc, calcium carbonate, silica, clay, diatomaceous earth, perlite) and organic filler (e.g., woodmeal) may be incorporated in the material. Further, an oxidation inhibitor such as 2,6-di-t-butyl-4-methylphenol (BHT) and butyl hydroxyanisole (BHA), an ultraviolet absorbent such as salicylic acid derivative, benzophenone and benzotriazole or a stabilizer such as phosphoric ester and carbodiimide may be used to enhance the thermal stability during formation.

The added amount of such a stabilizer is not specifically limited but is preferably from 0.01 to 1% based on the weight of the high molecular lactic polyester. The high molecular lactic polyester of the present invention exhibit a sufficient plasticity as it is and thus exhibits a good melt-formability. In order to accelerate the softening of the product, a plasticizer such as dioctyl adipate, dioctyl sebacate, trioctyl trimellitate, diethyl phthalate, dioctyl phthalate, polypropyleneglycoladipic acid and butanediol adipate may be added to the material.

Among these plasticizers, the polyester adipate plasticizer is desirable from the standpoint of formability or moldability and flexibility. In particular, a polyester adipate having a weight-average molecular weight of not more than 20,000 with its ends blocked by alcohol has a good compatibility with the polymer and thus is particularly desirable.

The added amount of such a plasticizer is not specifically limited. In order to avoid the elution of excessive plasticizer from the resin, i.e., bleeding, the added amount of such a plasticizer is preferably from 1 to 30% based on the weight of the high molecular lactic polyester.

Further, a metallic soap such as zinc stearate, magnesium stearate and calcium stearate, a lubricant such as mineral oil, liquid paraffin and ethylenebisstearamide, a nonionic surface active agent such as glycerinaliphatic ester and sucrose aliphate, an ionic surface active agent such as alkylsulfonic acid salt, a coloring agent such as titanium oxide and carbon black, etc. may be added to the material.

A foamed product can be prepared by the addition of an inorganic foaming agent such as sodium bicarbonate and ammonium bicarbonate or an organic foaming agent such as azodicarbonamide, azobisisobutyronitrile and sulfonylhydrazide or by previously impregnating the polymer of the present invention with a foaming agent such as pentane, butane and Freon or by directly supplying such a foaming agent into the extruder during extrusion. The polyester of the present invention can be laminated with a paper, aluminum foil or other decomposable polymer films by extrusion lamination method, dry lamination method or coextrusion method.

The fabrication of the sheet thus formed can be accomplished by vacuum forming, pressure forming, vacuum pressure forming or the like. The formation of the lactic copolymer polyester of the present invention into sheet can be accomplished by means of a known apparatus for use in the preparation of sheet made of general-purpose resin.

In the vacuum forming or vacuum pressure forming, plug-assist forming may be effected. The oriented sheet may be subjected to pressure forming. During the forming, the mold may be optionally heated or cooled. In particular, the mold can be heated to a temperature of not lower than the crystallization temperature to positively promote crystallization, making it possible to improve the heat resistance of the product.

The fabrication of the film thus formed can be accomplished by an ordinary fabrication method. In some detail, the film can be heat-sealed by means of an ordinary bag making machine such as horizontal pillow type bag making machine, horizontal pillow type bag making machine and twist bag making machine to obtain a bag-shaped product. In order to obtain a formed product other than sheet and film, an ordinary injection molding machine can be used to obtain a molded product such as vessel. The polyester of the present invention can also be easily blow-molded. In some detail, a single-layer or multi-layer bottle can be easily formed by the use of an existing blow molding machine. Referring to press molding, there is no special problem. In some detail, an ordinary press molding machine can be used to obtain a single-layer or laminated product.

The high molecular lactic polyester obtained according to the present invention has a good biodegradability. Even if discarded after used as general-purpose resin or wrapping material or rejected and discarded from the production line, it can help reduce the amount of wastes. In particular, even if discarded into the sea, it is hydrolyzed or decomposed by microorganism. When decomposed under the seawater, the polyester of the present invention can show a deteriorated resin strength in several months and thus can be decomposed to an extent such that the initial appearance is not maintained.

The present invention will be further described in the following examples and comparative examples, but the present invention should not be construed as being limited thereto. The "parts" as used herein is by weight unless otherwise specified.

The molecular weight was measured by a GPC measuring apparatus (hereinafter referred to as "GPC"; column temperature: 40° C.; solvent: tetrahydrofuran) relative to polystyrene as a reference sample.

The glass transition point and melting point were measured by means of differential scanning calorimeter (hereinafter referred to as "DSC"). The percent heat loss was measured by a differential thermogravimetric analyzer (hereinafter referred to as "TG/DTA" (The sample was heated at a rate of 100° C./min. from 20° C. to 220° C. wherein it was then kept for 50 minutes)).

For the tensile test, a 200-μm thick film which had been prepared by subjecting the polyester to processing by a hot press at a temperature of from 160° C. to 170° C. under a pressure of 200 kg/cm² for 2 minutes was subjected to test by a tensile testing machine (rate of pulling: 20 mm/min.). The Vicat softening temperature test was conducted in accordance with A method of JIS K7206. As the test specimen there was used a dumbbell-shaped piece formed by a 1-ounce injection molding machine. The machines as mentioned above are as follows:

GPC: TOSOH HLC-8020 (available from TOSOH CORPORATION)

DSC: DSC 200 (available from Seiko Instruments, Inc.)

TG/DTA: TG/DTA 220 (available from Seiko Instruments, Inc.)

Tensile testing machine: Tensilon (available from Toyo Seiki K.K.)

Vicat softening temperature: HDT. VSPT. TESTER (available from Toyo Seiki K.K.)

In the following examples, any one of the following three polyesters was used for examination unless otherwise specified.

As the polyester comprising an aliphatic dicarboxylic acid component there was used a polyester comprising 50 mol % of an adipic acid component, 28 mol % of an ethylene glycol component and 22 mol % of a neopentyl glycol component, having a weight-average molecular weight of 30,210 and a number-average molecular weight of 15,200. This polyester will be hereinafter referred to as "(P-1)".

As the polyester comprising an aromatic dicarboxylic acid component and an aliphatic dicarboxylic acid component there was used a polyester comprising 14 mol % of a terephthalic acid component, 16 mol % of an isophthalic acid component, 20 mol % of an adipic acid component, 28 mol % of an ethylene glycol component and 22 mol % of a neopentyl glycol component, having a weight-average molecular weight of 45,200 and a number-average molecular weight of 24,700. This polyester will be hereinafter referred to as "(P-2)".

The third polyester will be described later.

EXAMPLE 1

(P-1) in an amount of 10 parts, L-lactide in an amount of 90 parts, and pyromellitic anhydride in an amount of 0.002 part based on 100 parts of the sum of the amount of L-lactide and (P-1) were mixed. These components were dissolved and mixed at a temperature of 175° C. for 0.5 hour in an atmosphere of nitrogen gas. To the reaction mixture was then added 0.02 part of tin octanoate as a ring opening polymerization catalyst.

The reaction mixture was then allowed to undergo reaction at a temperature of 175° C. for 3 hours. The resulting copolymer was then withdrawn. The high molecular lactic polyester thus obtained was a yellowish transparent resin. It was confirmed from the result of GPC that a high molecular lactic polyester had been produced having a weight-average molecular weight of 315,000 and a number-average molecular weight of 122,000, which are greater than that of the polyester comprising an aromatic dicarboxylic acid component and an aliphatic dicarboxylic acid component as starting materials.

The result of GPC effected 3 hours after reaction shows that the fraction derived from the copolymer is single, demonstrating the production of a single copolymer. A small fraction derived from the remaining lactide was confirmed. It was also found that the high molecular lactic polyester has a glass transition point of about 56° C. and a melting point of about 158° C. The high molecular lactic polyester exhibited a tensile break stress of 41%, a tensile break strength of 520 kgf/cm² and an initial tensile elasticity modulus of 10,100 kgf/cm².

EXAMPLE 2

(P-2) in an amount of 5 parts, L-lactide in an amount of 93 parts, D-lactide in an amount of 2 parts, pyromellitic anhydride in an amount of 0.05 part based on 100 parts of the sum of the amount of the lactide and (P-2), and toluene in an amount of 20 parts were mixed. These components were then dissolved and mixed at a temperature of 175° C. in an atmosphere of nitrogen gas for 0.5 hour. To the reaction mixture were then added 0.02 part of tin octanoate as a ring opening polymerization catalyst. The reaction mixture was allowed to undergo reaction at a temperature of 175° C. for 3 hours. After reaction, toluene was removed under reduced pressure.

The high molecular lactic polyester thus produced was a colorless transparent resin having a weight-average molecular weight of 356,000 and a number-average molecular weight of 152,000. The high molecular lactic polyester exhibited a glass transition point of about 58° C., a melting point of about 160° C., a tensile break stress of 9.6%, a tensile break strength of 650 kgf/cm² and an initial tensile elasticity modulus of 13,000 kgf/cm².

EXAMPLE 3

(P-1) in an amount of 30 parts, L-lactide in an amount of 68 parts, D-lactide in an amount of 2 parts, trimellitic anhydride in an amount of 1 part based on 100 parts of the sum of the amount of the lactide and (P-1), and toluene in an amount of 15 parts were mixed. These components were then dissolved and mixed at a temperature of 165° C. in an atmosphere of nitrogen gas for 0.5 hour. To the reaction mixture were then added 0.02 part of tin octanoate as a ring opening polymerization catalyst. The reaction mixture was allowed to undergo reaction at a temperature of 165° C. for 3 hours. After reaction, toluene was removed under reduced pressure.

The high molecular lactic polyester thus produced was a colorless transparent resin having a weight-average molecular weight of 110,000 and a number-average molecular weight of 42,000. The high molecular lactic polyester exhibited a glass transition point of about 53° C., a melting point of about 150° C., a tensile break stress of 230%, a tensile break strength of 490 kgf/cm² and an initial tensile elasticity modulus of 8,100 kgf/cm².

EXAMPLE 4

(P-2) in an amount of 5 parts, L-lactide in an amount of 93 parts, D-lactide in an amount of 2 parts, and toluene in an amount of 15 parts were mixed. These components were then dissolved and mixed at a temperature of 175° C. in an atmosphere of nitrogen gas for 0.5 hour. To the reaction mixture were then added 0.02 part of tin octanoate as a ring opening polymerization catalyst. The reaction mixture was allowed to undergo polymerization for 3 hours. The lactic copolymer polyester thus obtained had a weight-average molecular weight of 161,000. To the lactic copolymer polyester was then added pyromellitic anhydride in an amount of 0.002 part based on 100 parts of the sum of the amount of the lactide and (P-2). The reaction mixture was then allowed to undergo reaction for 3 hours. After reaction, toluene was removed under reduced pressure.

The high molecular lactic polyester thus produced was a colorless transparent resin having a weight-average molecular weight of 517,000 and a number-average molecular weight of 215,000. The high molecular lactic polyester exhibited a glass transition point of about 59° C., a melting point of about 158° C., a tensile break stress of 12%, a tensile break strength of 550 kgf/cm$^2$ and an initial tensile elasticity modulus of 11,900 kgf/cm$^2$.

EXAMPLE 5

(P-1) in an amount of 30 parts, L-lactide in an amount of 70 parts, and toluene in an amount of 15 parts were mixed. These components were then dissolved and mixed at a temperature of 165° C. in an atmosphere of nitrogen gas for 0.5 hour. To the reaction mixture were then added 0.03 part of tin octanoate as a ring opening polymerization catalyst. The reaction mixture was allowed to undergo polymerization for 3 hours. The lactic copolymer polyester thus obtained had a weight-average molecular weight of 73,000. To the lactic copolymer polyester was then added pyromellitic anhydride in an amount of 0.05 part based on 100 parts of the sum of the amount of the lactide and (P-1). The reaction mixture was then allowed to undergo reaction for 2 hours.

After reaction, toluene was removed under reduced pressure. The high molecular lactic polyester thus produced was a colorless transparent resin having a weight-average molecular weight of 145,000 and a number-average molecular weight of 70,100. The high molecular lactic polyester exhibited a glass transition point of about 54° C., a melting point of about 149° C., a tensile break stress of 330%, a tensile break strength of 470 kgf/cm$^2$ and an initial tensile elasticity modulus of 8,200 kgf/cm$^2$.

EXAMPLE 6

(P-1) in an amount of 5 parts, L-lactide in an amount of 93 parts, D-lactide in an amount of 2 parts, and toluene in an amount of 20 parts were mixed. These components were then dissolved and mixed at a temperature of 165° C. in an atmosphere of nitrogen gas for 0.5 hour. To the reaction mixture were then added 0.05 part of tin octanoate as a ring opening polymerization catalyst. The reaction mixture was allowed to undergo polymerization for 3 hours. The lactic copolymer polyester thus obtained had a weight-average molecular weight of 161,000. To the lactic copolymer polyester was then added pyromellitic anhydride in an amount of 0.5 part based on 100 parts of the sum of the amount of the lactide and (P-1). The reaction mixture was then allowed to undergo reaction for 2 hours. After reaction, toluene was removed under reduced pressure.

The high molecular lactic polyester thus produced was a colorless transparent resin having a weight-average molecular weight of 327,000 and a number-average molecular weight of 119,000. The high molecular lactic polyester exhibited a glass transition point of about 57° C., a melting point of about 156° C., a tensile break stress of 18%, a tensile break strength of 510 kgf/cm$^2$ and an initial tensile elasticity modulus of 13,000 kgf/cm$^2$.

EXAMPLE 7

(P-1) in an amount of 20 parts and toluene in an amount of 15 parts were mixed. These components were then dissolved and mixed at a temperature of 100° C. in an atmosphere of nitrogen gas for 0.5 hour. To the reaction mixture were then added trimellitic anhydride in an amount of 0.002 part based on 100 parts of (P-1) and tetraisopropyl titanate as a catalyst in an amount of 0.005 part. The reaction mixture was then allowed to undergo reaction at a temperature of 120° C. for 2 hours. The polyester thus obtained exhibited a weight-average molecular weight of 54,100 and a number-average molecular weight of 19,400.

To the polyester were then added L-lactide in an amount of 70 parts, D-lactide in an amount of 10 parts and tin octanoate as a ring opening polymerization catalyst in an amount of 0.02 part. The reaction mixture was then allowed to undergo reaction at a temperature of 175° C. for 3 hours. After reaction, toluene was removed under reduced pressure. The high molecular lactic polyester thus produced was a brownish transparent resin having a weight-average molecular weight of 168,000 and a number-average molecular weight of 55,200.

The high molecular lactic polyester exhibited a glass transition point of about 51° C., a melting point of about 154° C., a tensile break stress of 180%, a tensile break strength of 420 kgf/cm$^2$ and an initial tensile elasticity modulus of 7,900 kgf/cm$^2$.

EXAMPLE 8

(P-2) in an amount of 5 parts and toluene in an amount of 15 parts were mixed. These components were then dissolved and mixed at a temperature of 120° C. in an atmosphere of nitrogen gas for 0.5 hour. To the reaction mixture were then added pyromellitic anhydride in an amount of 0.05 part based on 100 parts of (P-2) and tin octanoate as a catalyst in an amount of 0.001 part. The reaction mixture was then allowed to undergo reaction at a temperature of 120° C. for 2 hours. The polyester thus obtained exhibited a weight-average molecular weight of 71,100 and a number-average molecular weight of 32,400.

To the polyester were then added L-lactide in an amount of 93 parts, D-lactide in an amount of 2 parts and tin octanoate as a ring opening polymerization catalyst in an amount of 0.02 part. The reaction mixture was then allowed to undergo reaction at a temperature of 175° C. for 3 hours. After reaction, toluene was removed under reduced pressure. The high molecular lactic polyester thus produced was a colorless transparent resin having a weight-average molecular weight of 325,000 and a number-average molecular weight of 149,000. The high molecular lactic polyester exhibited a glass transition point of about 56° C., a melting point of about 152° C., a tensile break stress of 27%, a tensile break strength of 560 kgf/cm$^2$ and an initial tensile elasticity modulus of 12,000 kgf/cm$^2$.

EXAMPLE 9

31 mol % of a terephthalic acid component, 17 mol % of an adipic acid component, 23 mol % of an ethylene glycol component, 27 mol % of a neopentyl glycol component and 0.05 mol % of a pyromellitic anhydride component were charged. The reaction mixture was then esterified at a temperature of from 205° C. to 210° C. to have an acid value of 8.1. To the reaction mixture was then added 100 ppm of tetraisopropyl titanate. The reaction mixture was then allowed to undergo reaction at a temperature of from 215° C. to 220° C. Eventually, the reaction mixture was allowed to undergo deglycolation reaction under a pressure of 0.5 Torr for 8 hours.

The aromatic aliphatic polyester thus obtained exhibited a weight-average molecular weight of 118,000 and a number-average molecular weight of 34,500 (hereinafter referred to as "(P-3)"). To 10 parts of the polyester thus obtained were then added 90 parts of L-lactide and 15 parts of toluene. These components were was then dissolved and mixed at a temperature of 175° C. in an atmosphere of nitrogen gas for 0.25 hour. To the reaction mixture were then added 0.02 part of tin octanoate as a ring opening polymerization catalyst. The reaction mixture was then allowed to undergo reaction for 3 hours. To the reaction mixture was then added 0.1 part of ε-caprolactone. The reaction mixture was then allowed to undergo reaction at a temperature of 175° C. for 1 hour. After reaction, toluene was removed under reduced pressure.

The high molecular lactic polyester thus produced was a brownish transparent resin having a weight-average molecular weight of 340,000 and a number-average molecular weight of 129,000. The high molecular lactic polyester exhibited a glass transition point of about 55° C., a melting point of about 155° C., a tensile break stress of 28%, a tensile break strength of 460 kgf/cm$^2$ and an initial tensile elasticity modulus of 11,000 kgf/cm$^2$.

EXAMPLE 10

27 mol % of an adipic acid component, 20 mol % of a succinic acid component, 30 mol % of an ethylene glycol component, 20 mol % of a neopentyl glycol component and 0.3 mol % of a pyromellitic acid component were charged. The reaction mixture was then esterified at a temperature of from 205° C. to 210° C. to have an acid value of 9.1. To the reaction mixture was then added 100 ppm of tetraisopropyl titanate. The reaction mixture was then allowed to undergo deglycolation reaction at a temperature of from 215° C. to 220° C., eventually under a pressure of 0.5 Torr, for 8 hours.

The aliphatic polyester thus obtained exhibited a weight-average molecular weight of 53,500 and a number-average molecular weight of 16,500 (hereinafter referred to as "(P-4)"). To 30 parts of the polyester thus obtained were then added 68 parts of L-lactide, 2 parts of D-lactide and 15 parts of toluene. These components were was then dissolved and mixed at a temperature of 175° C. in an atmosphere of nitrogen gas for 0.25 hour. To the reaction mixture were then added 0.02 part of tin octanoate as a ring opening polymerization catalyst. The reaction mixture was then allowed to undergo reaction for 3 hours.

After reaction, toluene was removed under reduced pressure. The high molecular lactic polyester thus produced was a colorless transparent resin having a weight-average molecular weight of 151,000 and a number-average molecular weight of 101,000. The high molecular lactic polyester exhibited a glass transition point of about 53° C., a melting point of about 152° C., a tensile break stress of 270%, a tensile break strength of 400 kgf/cm$^2$ and an initial tensile elasticity modulus of 7,800 kgf/cm$^2$.

EXAMPLE 11

In the present example, a final reaction vessel comprising a series connection of three filling type 4-l capacity agitated reactors equipped with a helical agitating blade and a reaction vessel connected to the final reaction vessel via a ½ inch static mixer (Königs type static mixer available from Noritake Co., Ltd.) and two degasification tanks were used.

The starting materials were supplied in the following manner. In some detail, lactides and a hydroxyl-containing polymer were dissolved in toluene at a temperature of 110° C. in an atmosphere of nitrogen gas to obtain a 15% solution which was then supplied into the first reactor by means of a plunger pump in such a manner that the average residence time of the starting materials was 8 hours. As the catalyst there was used tin octanoate. This catalyst was added before the first reactor. An addition line was provided at the entrance of the third reaction vessel such that pyromellitic anhydride can be added to the material.

The supplied amount of these components were as follows:

Starting material supply flow rate: 1.5 l/hr.

Catalyst supply flow rate: 0.5 ml/hr.

Pyromellitic anhydride supply flow rate: 5.00 g/hr.

The lactide components and the hydroxyl-containing polymer components used were as follows:

L-lactide: 73%

D-lactide: 4%

Hydroxyl-containing polymer: 10%

Toluene: 13%

As the hydroxyl-containing polymer there was used a polyester comprising 35 mol % of adipic acid, 15 mol % of succinic acid, 40 mol % of ethylene glycol and 10 mol % of neopentyl glycol, having a weight-average molecular weight of 35,100 and a number-average molecular weight of 18,200 (hereinafter referred to as "(P-5)").

Tin octanoate as a catalyst was supplied in such an amount that the catalyst content reached 250 ppm. The polymer thus obtained was continuously withdrawn from the discharge end at the top of the final reaction vessel by means of a gear pump.

The three reaction vessels used were temperature-controlled as follows:

Reaction temperature in first reaction vessel: 155° C.

Reaction temperature in second reaction vessel: 155° C.

Reaction temperature in third reaction vessel: 165° C.

Reaction temperature in the static mixer: 165° C.

Referring to the degasification conditions, the temperature of the heat exchanger provided before the first degasification apparatus was controlled to 220° C., and the degasification tank was evacuated to 110 Torr. The temperature of the heat exchanger provided before the second degasification apparatus was controlled to 205° C., and the degasification tank was evacuated to 8 Torr.

The polymer thus obtained was pelletized, and then measured for various properties and physical properties. The pellet thus obtained was a slightly yellowish transparent resin. The high molecular lactic polyester thus produced was a colorless transparent resin having a weight-average molecular weight of 301,000 and a number-average molecular weight of 101,000. The high molecular lactic polyester exhibited a glass transition point of about 53° C., a melting point of about 152° C., a tensile break stress of 28%, a tensile break strength of 500 kgf/cm$^2$ and an initial tensile elasticity modulus of 11,800 kgf/cm$^2$.

EXAMPLE 12

A continuous polymerization apparatus was used having a polymerization zone consisting of a circulating polymerization line comprising a series connection of four static mixers having an inner diameter of 0.5 in. and a length of 60 cm, equipped with a circulating gear pump, and a polymerization line comprising a series connection of two static mixers having an inner diameter of ¾ in. and a length of 50 cm (available from Noritake Co., Ltd.; 15 mixing elements incorporated) directly connected to the circulating polymerization line.

The catalyst was mixed into the main starting material shortly before the main starting material supply pump by means of a static mixer having an inner diameter of ¼ in. and a length of 15.5 cm (available from Noritake Co., Ltd.;. 12 mixing elements incorporated).

A main starting material solution was prepared in an atmosphere of nitrogen gas. In some detail, 78 parts of L-lactide, 4 parts of D-lactide, 18 parts of a 50% toluene solution of an aliphatic polyester which had been processed with trimellitic acid to have a higher molecular weight (29 mol % of adipic acid component, 20 mol % of succinic acid component, 30 mol % of ethylene glycol component, 20 mol % of neopentyl glycol component, 0.3 mol % of trimellitic acid component; weight-average molecular weight: 53,500; number-average molecular weight: 16,500) (hereinafter referred to as "(P-6)"), and 0.04 part of zinc 2-ethylhexanate as a catalyst were subjected to continuous polymerization under the following conditions:

Main starting material supply flow rate: 400 ml/hr.
Catalyst supply flow rate: 1.6 ml/hr.
Reaction temperature: 160° C.
Rate of flow to be circulated in circulating polymerization line: 2 l/hr.
Reflux ratio: 5

The polymer solution thus obtained was then introduced into an apparatus comprising a heat exchanger and a degasification bath by an insulated gear pump for high viscosity so that it was degasificated. The temperature of the heat exchanger provided before the degasification apparatus was controlled to 200° C., and the degasification bath was evacuated to 4 to 10 Torr. The high molecular lactic polyester thus obtained was a yellowish transparent resin. The resin was pelletized, and then measured for various properties and physical properties.

The result of GPC showed that a high molecular lactic polyester having a weight-average molecular weight of 368,000 had been produced. The high molecular lactic polyester thus produced exhibited a glass transition point of about 55° C., a melting point of about 152° C., a tensile break stress of 30%, a tensile break strength of 490 kgf/cm$^2$ and an initial tensile elasticity modulus of 10,900 kgf/cm$^2$.

The high molecular lactic copolymer polyester thus pelletized was then processed by a hot press to prepare a 10 cm wide×10 cm long×100 μm thick sheet.

In some detail, the pelletized polyester having a weight-average molecular weight of 368,000 was pressed at a temperature of 165° C. under a pressure of 200 kg/cm$^2$ for 2 minutes to obtain a sheet having a weight-average molecular weight of 355,000. The drop in the molecular weight was 3.5%.

The sheet thus obtained was then buried in the earth for biodegradation test. The results are set forth in Table 1.

TABLE 1

| Days of burial | Weight-average molecular weight | Appearance |
| --- | --- | --- |
| 0 | 355,000 | Rigid, transparent |
| 30 | 317,000 | Rigid, semi-transparent |
| 100 | 181,000 | Brittle, white |
| 200 | 91,000 | Brittle, white |

EXAMPLE 13

To 99 parts of (P-2) were added 1 part of isophorone diisocyanate and 100 parts of toluene as a solvent. The atmosphere of the system was then replaced by an inert gas. The reaction mixture was then allowed to undergo reaction at a temperature of 85° C. for 1.0 hour.

After reaction, toluene was removed under reduced pressure. The urethane bond-containing aromatic aliphatic polyester as a starting material exhibited a weight-average molecular weight of 98,300 and a number-average molecular weight of 41,900 and showed a single GPC peak demonstrating the production of a single product. To 5 parts of the urethane bond-containing aromatic aliphatic polyester as a starting material were then added 93 parts of L-lactide and 2 parts of D-lactide. The atmosphere of the system was then replaced by an inert gas. These components were then dissolved and mixed at a temperature of 110° C. for 1 hour. To the reaction mixture was then added 200 ppm of tin octanoate as a ring opening polymerization catalyst.

Thereafter, the reaction mixture was allowed to undergo reaction at a temperature of 165° C. for 1.5 hours. The resulting copolymer composition was then withdrawn. The urethane bond-containing lactic polyester thus obtained was a brownish transparent resin. The result of GPC showed that an urethane bond-containing lactic polyester having a weight-average molecular weight of 291,000 and a number-average molecular weight of 142,000 had been produced. The product showed a single GPC peak demonstrating the production of a single copolymer. 2.4% of the lactide monomer remained. The result of DSC showed that the urethane bond-containing lactic polyester exhibits a glass transition point of 55° C. and a melting point of 173° C. The urethane bond-containing lactic polyester also exhibited a tensile break stress of 39%, a tensile break strength of 430 kgf/cm$^2$, an initial tensile elasticity modulus of 12,000 kgf/cm$^2$ and a Vicat softening temperature of 51° C.

EXAMPLE 14

To 5 parts of (P-1) were added 93 parts of L-lactide and 2 parts of D-lactide. The atmosphere of the system was then replaced by an inert gas. These components were then dissolved and mixed at a temperature of 165° C. for 1 hour. To the reaction mixture was then added 0.02 part of tin octanoate as a ring opening polymerization catalyst. The reaction mixture was then allowed to undergo reaction for 8 hours.

The lactic polyester thus obtained was a colorless transparent resin. The result of GPC showed that a lactic polyester having a weight-average molecular weight of 144,400 had been produced. To 99 parts of the lactic polyester were then added 1 part of Pandex P-870 (available from Dainippon Ink & Chemicals, Inc.; NCO%=3.0) and 100 parts of toluene as a solvent. The atmosphere of the system was then replaced by an inert gas. To the reaction mixture were then added 50 ppm of tetraethylammonium chloride as a catalyst. The reaction mixture was then allowed to undergo reaction at a temperature of 90° C. for 1 hour.

Thereafter, the reaction mixture was allowed to undergo reaction at a temperature of 165° C. for 1.5 hours. The resulting copolymer composition was then withdrawn. The urethane bond-containing lactic polyester thus obtained was a whitish transparent resin. The result of GPC showed that an urethane bond-containing lactic polyester having a weight-average molecular weight of 275,000 had been produced. The product showed a single GPC peak demonstrating the production of a single copolymer. 2.8% of the lactide monomer remained. The result of DSC showed that the urethane bond-containing lactic polyester exhibits a glass transition point of 54° C. and a melting point of 161° C. The urethane bond-containing lactic polyester also exhibited a tensile break stress of 72%, a tensile break strength of 400 kgf/cm$^2$, an initial tensile elasticity modulus of 11,000 kgf/cm$^2$ and a Vicat softening temperature of 50° C.

EXAMPLE 15

In the present example, a final reaction vessel comprising a series connection of three filling type 4-l capacity agitated reactors equipped with a helical agitating blade and a reaction vessel connected to the final reaction vessel via a ½ inch static mixer (Königs type static mixer available from Noritake Co., Ltd.) and two degasification tanks were used.

The starting materials were supplied in the following manner. In some detail, lactides and a hydroxyl-containing polymer were dissolved in toluene at a temperature of 110° C. in an atmosphere of nitrogen gas to obtain a 15% solution which was then supplied into the first reactor by means of a plunger pump in such a manner that the average residence time of the starting materials was 8 hours. As the catalyst there was used tin octanoate. This catalyst was added before the first reactor. An addition line was provided at the entrance of the third reaction vessel such that Pandex P-870 (Dainippon Ink & Chemicals, Inc.; NCO%=3.0) can be added to the material.

The supplied amount of these components were as follows:

Starting material supply flow rate: 1.5 l/hr.

Catalyst supply flow rate: 0.5 ml/hr.

Pandex P-870 supply flow rate: 5.0 g/hr.

The lactide components and the hydroxyl-containing polymer components used were as follows:

L-lactide: 73%

D-lactide: 4%

Hydroxyl-containing polymer: 10%

Toluene: 13%

As the hydroxyl-containing polymer there was used (P-5). Tin octanoate as a catalyst was supplied in such an amount that the catalyst content reached 250 ppm. The polymer thus obtained was continuously withdrawn from the discharge end at the top of the final react-ion vessel by means of a gear pump.

The three reaction vessels used were temperature-controlled as follows:

Reaction temperature in first reaction vessel: 155° C.

Reaction temperature in second reaction vessel: 155° C.

Reaction temperature in third reaction vessel: 165° C.

Reaction temperature in the static mixer: 165° C.

Referring to the degasification conditions, the temperature of the heat exchanger provided before the first degasification apparatus was controlled to 220° C., and the degasification tank was evacuated to 110 Torr. The temperature of the heat exchanger provided before the second degasification apparatus was controlled to 205° C., and the degasification tank was evacuated to 8 Torr.

The polymer thus obtained was pelletized, and then measured for various properties and physical properties. The pellet thus obtained was a slightly yellowish transparent resin. The high molecular lactic polyester thus produced was a colorless transparent resin having a weight-average molecular weight of 416,000 and a number-average molecular weight of 202,000. The high molecular lactic polyester exhibited a glass transition point of about 52° C., a melting point of about 156° C., a tensile break stress of 58%, a tensile break strength of 470 kgf/cm$^2$, an initial tensile elasticity modulus of 11,000 kgf/cm$^2$ and a Vicat softening temperature of 50° C.

EXAMPLE 16

A continuous polymerization apparatus was used having a polymerization zone consisting of a circulating polymerization line comprising a series connection of four static mixers having an inner diameter of 0.5 in. and a length of 60 cm, equipped with a circulating gear pump, and a polymerization line comprising a series connection of two static mixers having an inner diameter of ¾ in. and a length of 50 cm (available from Noritake Co., Ltd.; 15 mixing elements incorporated) directly connected to the circulating polymerization line.

The catalyst was mixed into the main starting material shortly before the main starting material supply pump by means of a static mixer having an inner diameter of ¼ in. and a length of 15.5 cm (available from Noritake Co., Ltd.; 12 mixing elements incorporated).

A main starting material solution was prepared in an atmosphere of nitrogen gas. In some detail, 78 parts of L-lactide, 4 parts of D-lactide, 18 parts of a 50% toluene solution of an aliphatic polyester which had been processed with hexamethylene diisocyanate to have a higher molecular weight (29 mol % of adipic acid component, 20 mol % of succinic acid component, 30 mol % of ethylene glycol component, 20 mol % of neopentyl glycol component, 0.5 mol % of hexamethylene diisocyanate component; weight-average molecular weight: 62,100; number-average molecular weight: 26,500) (hereinafter referred to as "(P-7)"), and 0.04 part of zinc 2-ethylhexanate as a catalyst were subjected to continuous polymerization under the following conditions:

Main starting material supply flow rate: 400 ml/hr.

Catalyst supply flow rate: 1.6 ml/hr.

Reaction temperature: 160° C.

Rate of flow to be circulated in circulating polymerization line: 2 l/hr.

Reflux ratio: 5

The polymer solution thus obtained was then introduced into an apparatus comprising a heat exchanger and a degasification bath by an insulated gear pump for high viscosity so that it was degasificated. The temperature of the heat exchanger provided before the degasification apparatus was controlled to 200° C., and the degasification bath was evacuated to 4 to 10 Torr. The high molecular lactic polyester thus obtained was a yellowish transparent resin. The resin was pelletized, and then measured for various properties and physical properties.

The result of GPC showed that a high molecular lactic copolymer polyester having a weight-average molecular weight of 404,000 and a number-average molecular weight of 208,000 had been produced. The high molecular lactic polyester thus produced exhibited a glass transition point of about 56° C., a melting point of about 158° C., a tensile break stress of 40%, a tensile break strength of 500 kgf/cm$^2$, an initial tensile elasticity modulus of 14,000 kgf/cm$^2$ and a Vicat softening temperature of 52° C.

EXAMPLE 17

To 98 parts of (P-1) were added 2 parts of toluene2,4-diisocyanate and 100 parts of toluene as a solvent. The atmosphere of the system was then replaced by an inert gas.

The reaction mixture was then allowed to undergo reaction at a temperature of 85° C. for 1.0 hour.

After reaction, toluene was removed under reduced pressure. The urethane bond-containing aromatic aliphatic polyester as a starting material exhibited a weight-average molecular weight of 111,000 and a number-average molecular weight of 43,000 and showed a single GPC peak demonstrating the production of a single product. To 30 parts of the urethane bond-containing aromatic aliphatic polyester as a starting material were then added 68 parts of L-lactide and 2 parts of D-lactide. The atmosphere of the system was then replaced by an inert gas. These components were then dissolved and mixed at a temperature of 110° C. for 1 hour. To the reaction mixture was then added 200 ppm of tin octanoate as a ring opening polymerization catalyst.

Thereafter, the reaction mixture was allowed to undergo reaction at a temperature of 165° C. for 1.5 hours. The resulting copolymer composition was then withdrawn. The urethane bond-containing lactic polyester thus obtained was a brownish transparent resin. The result of GPC showed that an urethane bond-containing lactic polyester having a weight-average molecular weight of 152,000 and a number-average molecular weight of 88,000 had been produced. The product showed a single GPC peak demonstrating the production of a single copolymer. 1.8% of the lactide monomer remained. The result of DSC showed that the urethane bond-containing lactic polyester exhibits a glass transition point of 50° C. and a melting point of 162° C. The urethane bond-containing lactic polyester also exhibited a tensile break stress of 310%, a tensile break strength of 280 kgf/cm$^2$, an initial tensile elasticity modulus of 9,000 kgf/cm$^2$ and a Vicat softening temperature of 49° C.

EXAMPLE 18

To 30 parts of (P-1) were added 70 parts of L-lactide. These components were then dissolved and mixed at a temperature of 165° C. for 1 hour in an atmosphere of an inert gas. To the reaction mixture was then added 0.02 part of tin octanoate as a ring opening polymerization catalyst. The reaction mixture was then allowed to undergo reaction for 8 hours.

The lactic polyester thus obtained was a colorless transparent resin. The result of GPC showed that a lactic polyester having a weight-average molecular weight of 73,000 had been produced. To 99 parts of the lactic polyester were then added 1 part of triphenylmethane-4,4',4"-triisocyanate and 100 parts of toluene as a solvent. The atmosphere of the system was then replaced by an inert gas. To the reaction mixture were then added 50 ppm of tetraethylammonium chloride as a catalyst. The reaction mixture was then allowed to undergo reaction at a temperature of 90° C. for 1 hour.

Thereafter, the reaction mixture was allowed to undergo reaction at a temperature of 165° C. for 1.5 hours. The resulting copolymer composition was then withdrawn. The urethane bond-containing lactic polyester thus obtained was a whitish transparent resin. The result of GPC showed that an urethane bond-containing lactic polyester having a weight-average molecular weight of 147,000 and a number-average molecular weight of 55,000 had been produced. The product showed a single GPC peak demonstrating the production of a single copolymer. 2.0% of the lactide monomer remained. The result of DSC showed that the urethane bond-containing lactic polyester exhibits a glass transition point of 49° C. and a melting point of 161° C. The urethane bond-containing lactic polyester also exhibited a tensile break stress of 280%, a tensile break strength of 300 kgf/cm$^2$, an initial tensile elasticity modulus of 9,900 kgf/cm$^2$ and a Vicat softening temperature of 47° C.

EXAMPLE 19

The pellet obtained in Example 14 was thoroughly dried, and then extruded through an extruder equipped with a screw having L/D of 24 and a diameter of 50 mm (available from Tanabe Plastic Co., Ltd.) at an extrusion temperature of 190° C. to obtain a 0.15-mm thick sheet having a good transparency. The extrusion was effected at a screw revolution speed of 24 rpm, a discharge rate of 16 kg/hr, a back pressure of 86 kg/cm$^2$ and a take-off speed of 6.0 m/min.

EXAMPLE 20

The 0.15-mm sheet obtained in Example 17 was formed by a vacuum forming machine (available from Sanwa Kogyo K.K.). In some detail, the sheet was heated for 5 seconds, formed and cooled for 5 seconds, and then released from the mold in 1 second to form a tray cover for dish. As a result, a formed product having an excellent mold reproducibility and transparency was obtained.

EXAMPLE 21

The pellet obtained in Example 1 was thoroughly dried, and then blow-molded by a blow molding machine equipped with an extruder having a screw having L/D of 25 and a diameter of 40 mm (produced by The Japan Steel Works, Ltd.) to obtain a 60 ml bottle having an excellent mold reproducibility and transparency. In some detail, the pellet was blow-molded at a cylinder temperature of from 170° C. to 180° C., a cylinder head temperature of 180° C., a mold temperature of 32° C. and a discharge rate of 4.2 kg/hr with air blown therethrough from the die core at a rate of 3 kgf/cm$^2$.

EXAMPLE 22

The pellet obtained in Example 4 was thoroughly dried, extruded through a 50-mm extruder equipped with a 400-mm wide die, and then laminated on a paper having a weight of 200 g/m$^2$. In some detail, the pellet was extruded at a cylinder temperature of from 150° C. to 210° C., a die temperature of 210° C., a cooling roll temperature of 60° C., a discharge rate of 4 kg/hr, and a line speed of 10 m/min.

The laminated paper thus obtained exhibited a uniform thickness and a laminate strength as high as not less than 370 g/15 mm.

COMPARATIVE EXAMPLE 1

To 100 parts of L-lactide were added 15 parts of toluene. The mixture was dissolved and stirred at a temperature of 175° C. in an atmosphere of nitrogen gas for 0.5 hour. To the reaction mixture were then added 0.02 part of tin octanoate as a ring opening polymerization catalyst. The reaction mixture was then allowed to undergo polymerization for 3 hours. After reaction, toluene was removed under reduced pressure. The poly(L-lactic acid) thus obtained was a colorless transparent resin having a weight-average molecular weight of 273,000 and a number-average molecular weight of 140,000. The resin exhibited a glass transition point of about 57° C., a melting point of about 158° C., a tensile break stress of 6.0%, a tensile break strength of 450 kgf/cm$^2$ and an initial tensile elasticity modulus of 11,000 kgf/cm$^2$.

COMPARATIVE EXAMPLE 2

To 70 parts of L-lactide were added 30 parts of a polycaprolactone ("Tone", available from UCC) and 15 parts of toluene. The mixture was dissolved and stirred at a temperature of 175° C. in an atmosphere of nitrogen gas for 0.5 hour. To the reaction mixture were then added 0.02 part of tin octanoate as a ring opening polymerization catalyst. The reaction mixture was then allowed to undergo polymerization for 3 hours. After reaction, toluene was removed under reduced pressure. The lactic copolymer polyester thus obtained was a white resin having a weight-average molecular weight of 123,000 and a number-average molecular weight of 62,000. The resin exhibited a glass transition point of about 30° C., a melting point of about 149° C., a tensile break stress of 100%, a tensile break strength of 320 kgf/cm$^2$ and an initial tensile elasticity modulus of 6,800 kgf/cm$^2$.

COMPARATIVE EXAMPLE 3

To 10 parts of (P-1) were added 90 parts of L-lactide and 20 parts of toluene. The mixture was dissolved and stirred at a temperature of 175° C. in an atmosphere of nitrogen gas for 0.5 hour. To the reaction mixture were then added 0.02 part of tin octanoate as a ring opening polymerization catalyst. The reaction mixture was then allowed to undergo polymerization for 3 hours. After reaction, toluene was removed under reduced pressure. The lactic copolymer polyester thus obtained was a colorless transparent resin having a weight-average molecular weight of 140,000 and a number-average molecular weight of 81,000. The resin exhibited a glass transition point of about 47° C., a melting point of about 156° C., a tensile break stress of 12%, a tensile break strength of 450 kgf/cm$^2$ and an initial tensile elasticity modulus of 10,000 kgf/cm$^2$.

COMPARATIVE EXAMPLE 4

To 20 parts of (P-1) were added 70 parts of L-lactide, 10 parts of D-lactide and 20 parts of toluene. The mixture was dissolved and stirred at a temperature of 175° C. in an atmosphere of nitrogen gas for 0.5 hour. To the reaction mixture were then added 0.02 part of tin octanoate as a ring opening polymerization catalyst. The reaction mixture was then allowed to undergo polymerization for 3 hours. After reaction, toluene was removed under reduced pressure. The lactic copolymer polyester thus obtained was a colorless transparent resin having a weight-average molecular weight of 110,000 and a number-average molecular weight of 63,200. The resin exhibited a glass transition point of about 44° C., a melting point of about 154° C., a tensile break stress of 21%, a tensile break strength of 390 kgf/cm$^2$ and an initial tensile elasticity modulus of 7,600 kgf/cm$^2$.

COMPARATIVE EXAMPLE 5

To 30 parts of (P-1) were added 68 parts of L-lactide, 2 parts of D-lactide and 20 parts of toluene. The mixture was dissolved and stirred at a temperature of 165° C. in an atmosphere of nitrogen gas for 0.5 hour. To the reaction mixture were then added 0.03 part of tin octanoate as a ring opening polymerization catalyst. The reaction mixture was then allowed to undergo polymerization for 3 hours. After reaction, toluene was removed under reduced pressure. The lactic copolymer polyester thus obtained was a colorless transparent resin having a weight-average molecular weight of 78,000 and a number-average molecular weight of 41,000. The resin exhibited a glass transition point of about 38° C., a melting point of about 146° C., a tensile break stress of 40%, a tensile break strength of 300 kgf/cm$^2$ and an initial tensile elasticity modulus of 5,800 kgf/cm$^2$.

COMPARATIVE EXAMPLE 6

To 5 parts of (P-2) were added 93 parts of L-lactide, 2 parts of D-lactide and 20 parts of toluene. The mixture was dissolved and stirred at a temperature of 175° C. in an atmosphere of nitrogen gas for 0.5 hour. To the reaction mixture were then added 0.03 part of tin octanoate as a ring opening polymerization catalyst. The reaction mixture was then allowed to undergo polymerization for 3 hours. After reaction, toluene was removed under reduced pressure. The lactic copolymer polyester thus obtained was a colorless transparent resin having a weight-average molecular weight of 161,000 and a number-average molecular weight of 83,200. The resin exhibited a glass transition point of about 46° C., a melting point of about 154° C., a tensile break stress of 7.7%, a tensile break strength of 410 kgf/cm$^2$ and an initial tensile elasticity modulus of 7,500 kgf/cm$^2$.

COMPARATIVE EXAMPLE 7

To 30 parts of (P-1) were added 70 parts of L-lactide and 15 parts of toluene. The mixture was dissolved and stirred at a temperature of 165° C. in an atmosphere of nitrogen gas for 0.5 hour. To the reaction mixture were then added 0.03 part of tin octanoate as a ring opening polymerization catalyst. The reaction mixture was then allowed to undergo polymerization for 3 hours. After reaction, toluene was removed under reduced pressure. The lactic copolymer polyester thus obtained was a colorless transparent resin having a weight-average molecular weight of 73,000 and a number-average molecular weight of 37,000. The resin exhibited a glass transition point of about 45° C., a melting point of about 151° C., a tensile break stress of 78%, a tensile break strength of 400 kgf/cm$^2$ and an initial tensile elasticity modulus of 7,600 kgf/cm$^2$.

COMPARATIVE EXAMPLE 8

To 5 parts of (P-1) were added 93 parts of L-lactide, 2 parts of D-lactide and 20 parts of toluene. The mixture was dissolved and stirred at a temperature of 175° C. in an atmosphere of nitrogen gas for 0.5 hour. To the reaction mixture were then added 0.03 part of tin octanoate as a ring opening polymerization catalyst. The reaction mixture was then allowed to undergo polymerization for 3 hours. After reaction, toluene was removed under reduced pressure. The lactic copolymer polyester thus obtained was a colorless transparent resin having a weight-average molecular weight of 144,000 and a number-average molecular weight of 73,000. The resin exhibited a glass transition point of about 44° C., a melting point of about 153° C., a tensile break stress of 3.5%, a tensile break strength of 400 kgf/cm$^2$ and an initial tensile elasticity modulus of 10,500 kgf/cm$^2$.

The results of the measurement of various properties and TG/DTA (weight loss) of the lactic copolymer polyesters obtained in the foregoing examples and comparative examples are set forth in Tables 2 to 8. The following abbreviations will be used in these tables.

Trimellitic acid: TM

Trimellitic anhydride: TMA

Pyromellitic acid: PM

Pyromellitic anhydride: PMDA

TABLE 2

| Materials or properties | Example 1 | Example 2 | Example 3 | Example 4 |
|---|---|---|---|---|
| Starting material | | | | |
| L-LD (parts) | 90 | 93 | 68 | 93 |
| D-LD (parts) | 0 | 2 | 2 | 2 |
| Polyester | P-1 | P-2 | P-1 | P-2 |
| (parts) | 10 | 5 | 30 | 5 |
| Mw × $1000^{-1}$ | 30.2 | 45.2 | 30.2 | 45.2 |
| Polyvalent carboxylic acid | PMDA | PMDA | TMA | PMDA |
| (parts) | 0.002 | 0.05 | 1 | 0.002 |
| Mw × $1000^{-1}$ | 315 | 356 | 110 | 517 |
| % Weight loss | 1.5 | 1.7 | 7.7 | 2.9 |
| Glass transition point (°C.) | 56 | 58 | 53 | 59 |
| Tensile break stress (%) | 41 | 9.6 | 230 | 12 |
| Tensile break strength (kgf/cm$^2$) | 520 | 650 | 490 | 550 |
| Initial tensile elasticity modulus (kgf/cm$^2$) | 10,100 | 13,000 | 8,100 | 11,900 |

TABLE 3

| Materials or properties | Example 5 | Example 6 | Example 7 | Example 8 |
|---|---|---|---|---|
| Starting material | | | | |
| L-LD (parts) | 70 | 93 | 70 | 93 |
| D-LD (parts) | 0 | 2 | 10 | 2 |
| Polyester | P-1 | P-1 | P-1 | P-2 |
| (parts) | 30 | 5 | 20 | 5 |
| Mw × $1000^{-1}$ | 30.2 | 30.2 | 30.2 | 45.2 |
| Polyvalent carboxylic acid | PMDA | PMDA | TMA | PMDA |
| (parts) | 0.05 | 0.5 | 0.002 | 0.05 |
| Mw × $1000^{-1}$ | 145 | 327 | 168 | 325 |

TABLE 3-continued

| Materials or properties | Example 5 | Example 6 | Example 7 | Example 8 |
|---|---|---|---|---|
| % Weight loss | 7.5 | 2.2 | 7.8 | 3.4 |
| Glass transition point (°C.) | 54 | 57 | 51 | 56 |
| Tensile break stress (%) | 330 | 18 | 180 | 27 |
| Tensile break strength (kgf/cm$^2$) | 470 | 510 | 420 | 560 |
| Initial tensile elasticity modulus (kgf/cm$^2$) | 8,200 | 13,000 | 7,900 | 12,000 |

TABLE 4

| Materials or properties | Example 9 | Example 10 | Example 11 | Example 12 |
|---|---|---|---|---|
| Starting material | | | | |
| L-LD (parts) | 90 | 68 | 84 | 86 |
| D-LD (parts) | 0 | 2 | 5 | 4 |
| Polyester | P-3 | P-4 | P-5 | P-6 |
| (parts) | 10 | 30 | 11 | 10 |
| Mw × $1000^{-1}$ | 118 | 53.5 | 35.1 | 53.5 |
| Polyvalent carboxylic acid | PMDA | PM | PMDA | TM |
| (parts) | 0.14 | 1 | 0.3 | 1 |
| Mw × $1000^{-1}$ | 340 | 151 | 301 | 368 |
| % Weight loss | 3.3 | 8.1 | 3.9 | 4.2 |
| Glass transition point (°C.) | 55 | 53 | 53 | 55 |
| Tensile break stress (%) | 28 | 270 | 28 | 30 |
| Tensile break strength (kgf/cm$^2$) | 460 | 400 | 500 | 490 |
| Initial tensile elasticity modulus (kgf/cm$^2$) | 11,000 | 7,800 | 11,800 | 10,900 |

TABLE 5

| Materials or properties | Example 13 | Example 14 | Example 14 | Example 16 |
|---|---|---|---|---|
| Starting material | | | | |
| L-LD (parts) | 93 | 93 | 84 | 86 |
| D-LD (parts) | 2 | 2 | 5 | 4 |
| Polyester | P-2 | P-1 | P-5 | P-7 |
| (parts) | 5 | 5 | 11 | 10 |
| Mw × $1000^{-1}$ | 45.2 | 30.2 | 35.1 | 62.1 |
| Polyvalent isocyanate | Isophorone diisocyanate | Pandex P-870 | Pandex P-870 | Hexamethylene diisocyanate |
| (parts) | 1 | 1 | 0.4 | 1.3 |
| Mw × $1000^{-1}$ | 291 | 275 | 416 | 404 |
| % Weight loss | 4.9 | 3.2 | 3.1 | 3.8 |
| Glass transition point (°C.) | 55 | 54 | 52 | 56 |
| Tensile break stress (%) | 39 | 72 | 58 | 40 |
| Tensile break strength (kgf/cm$^2$) | 430 | 400 | 470 | 500 |
| Initial tensile elasticity modulus (kg/cm$^2$) | 12,000 | 11,000 | 11,000 | 14,000 |
| Vicat softening temperature (°C.) | 51 | 50 | 50 | 52 |

TABLE 6

| Materials or properties | Example 17 | Example 18 |
|---|---|---|
| Starting material | | |
| L-LD (parts) | 68 | 70 |
| D-LD (parts) | 2 | 0 |
| Polyester | P-1 | P-1 |
| (parts) | 30 | 30 |
| Mw × 1000$^{-1}$ | 30.2 | 30.2 |
| Polyvalent isocyanate | Toluene-2,4-diisocyanate | Triphenylmethane triisocyanate |
| (parts) | 2 | 1 |
| Mw × 1000$^{-1}$ | 152 | 147 |
| % Weight loss | 3.9 | 2.8 |
| Glass transition point (°C.) | 50 | 49 |
| Tensile break stress (%) | 310 | 280 |
| Tensile break strength (kgf/cm$^2$) | 280 | 300 |
| Initial tensile elasticity modulus (kg/cm$^2$) | 9,000 | 9,900 |
| Vicat softening temperature (°C.) | 49 | 47 |

TABLE 7

| Materials or properties | Comparative Example 1 | Comparative Example 2 | Comparative Example 3 | Comparative Example 4 |
|---|---|---|---|---|
| Starting material | | | | |
| L-LD (parts) | 100 | 70 | 90 | 70 |
| D-LD (parts) | 0 | 0 | 0 | 10 |
| Polyester | — | Tone | P-1 | P-1 |
| (parts) | — | 30 | 10 | 20 |
| Mw × 1000$^{-1}$ | — | — | 30.2 | 30.2 |
| Mw × 1000$^{-1}$ | 273 | 123 | 140 | 110 |
| % Weight loss | 10.3 | 15.1 | 9.9 | 12.1 |
| Glass transition point (°C.) | 57 | 30 | 47 | 44 |
| Tensile break stress (%) | 6.0 | 100 | 12 | 21 |
| Tensile break strength (kgf/cm$^2$) | 450 | 320 | 450 | 390 |
| Initial tensile elasticity modulus (kg/cm$^2$) | 11,000 | 6,800 | 10,000 | 7,600 |

TABLE 8

| Materials or properties | Comparative Example 5 | Comparative Example 6 | Comparative Example 7 | Comparative Example 8 |
|---|---|---|---|---|
| Starting material | | | | |
| L-LD (parts) | 68 | 93 | 70 | 93 |
| D-LD (parts) | 2 | 2 | 0 | 2 |
| Polyester | P-1 | P-2 | P-1 | P-1 |
| (parts) | 30 | 5 | 30 | 5 |
| Mw × 1000$^{-1}$ | 30.2 | 45.2 | 30.2 | 30.2 |
| Mw × 1000$^{-1}$ | 78 | 161 | 73 | 145 |
| % Weight loss | 10.9 | 11.3 | 10.5 | 9.1 |
| Glass transition point (°C.) | 38 | 46 | 45 | 44 |
| Tensile break stress (%) | 40 | 7.7 | 78 | 3.5 |
| Tensile break strength (kgf/cm$^2$) | 300 | 410 | 400 | 400 |
| Initial tensile elasticity modulus (kg/cm$^2$) | 5,800 | 7,500 | 7,600 | 10,500 |

The present invention can provide a process for the preparation of a biodegradable high molecular lactic polyester which exhibits a sufficiently high molecular weight and heat resistance and shows a sufficient rigidity, flexibility and transparency depending on the purpose.

While the invention has been described in detail and with reference to specific embodiments thereof, it will be apparent to one skilled in the art that various changes and modifications can be made therein without departing from the spirit and scope thereof.

What is claimed is:

1. A process for the preparation of a high molecular lactic copolymer polyester, which comprises reacting a polyester terminated by hydroxyl group at both ends (B1) with a polyvalent isocyanate (E) having 2 or more functionalities in such an amount that the proportion of the component (E) is from 0.01 to 5% by weight of the amount of the polyester (B1) to obtain a polyester (B4) having a weight-average molecular weight of from 10,000 to 300,000, and then allowing said polyester (B4) and lactide (A) to undergo ring opening copolymerization in such an amount that the weight ratio of (A)/(B4) is from 50/50 to 98/2 in the presence of a ring opening polymerization catalyst (D).

2. A process for the preparation of a high molecular lactic copolymer polyester, which comprises allowing a lactide (A) and a polyester terminated by hydroxyl group at both ends (B1) to undergo ring opening copolymerization in such an amount that the weight ratio of (A)/(B1) is from 50/50 to 98/2 in the presence of a ring opening polymerization catalyst (D) to prepare a polyester having a weight-average molecular weight of from 10,000 to 300,000, and then reacting said polyester with a polyvalent isocyanate having 3 or more functionalities in such an amount that the proportion of said polyvalent isocyanate (F) is from 0.01 to 5% by weight of the sum of the amount of the components (A) and (B1).

3. The process for the preparation of a high molecular lactic copolymer polyester according to claim 1 or 2, wherein said polyester terminated by hydroxyl group at both ends (B1) has a weight-average molecular weight of from 10,000 to 200,000.

4. The process for the preparation of a high molecular lactic copolymer polyester according to any one of claims 1 and 2, wherein the resulting high molecular lactic copolymer polyester has a weight-average molecular weight of from 20,000 to 600,000.

5. The process for the preparation of a high molecular lactic copolymer polyester according to any one of claims 1 and 2, wherein a static mixer is used as a polymerization reaction vessel.

6. The process for the preparation of a high molecular lactic copolymer polyester according to any one of claims 1 and 2, wherein a continuous polymerization apparatus comprising a series connection of two or more agitated reaction vessels is used.

7. A formed or molded product of a high molecular lactic copolymer polyester prepared by the preparation process according to any one of claims 1 and 2.

* * * * *